(12) United States Patent
Garg et al.

(10) Patent No.: US 11,914,993 B1
(45) Date of Patent: Feb. 27, 2024

(54) EXAMPLE-BASED SYNTHESIS OF RULES FOR DETECTING VIOLATIONS OF SOFTWARE CODING PRACTICES

(71) Applicant: Amazon Technologies, Inc., Seattle, WA (US)

(72) Inventors: Pranav Garg, Secaucus, NJ (US); Sengamedu Hanumantha Rao Srinivasan, Seattle, WA (US); Benjamin Robert Liblit, Leesburg, VA (US); Rajdeep Mukherjee, San Jose, CA (US); Omer Tripp, San Jose, CA (US); Neela Sawant, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 294 days.

(21) Appl. No.: 17/364,768

(22) Filed: Jun. 30, 2021

(51) Int. Cl.
*G06F 8/77* (2018.01)
*G06N 20/00* (2019.01)

(52) U.S. Cl.
CPC .............. *G06F 8/77* (2013.01); *G06N 20/00* (2019.01)

(58) Field of Classification Search
CPC ................................. G06F 8/77; G06N 20/00
USPC .................................................. 717/114–135
See application file for complete search history.

(56) References Cited

U.S. PATENT DOCUMENTS

| 5,163,016 | A | * | 11/1992 | Har'El | G06F 30/30 716/102 |
|---|---|---|---|---|---|
| 9,361,077 | B1 | | 6/2016 | Hale et al. | |
| 9,524,226 | B2 | | 12/2016 | Calcagno et al. | |
| 9,639,703 | B2 | | 5/2017 | Liu | |
| 9,678,721 | B2 | | 6/2017 | Hale et al. | |
| 9,898,280 | B2 | | 2/2018 | Balachandran | |
| 9,946,880 | B2 | | 4/2018 | Lee et al. | |
| 2005/0166193 | A1 | * | 7/2005 | Smith | G06F 8/75 717/143 |
| 2012/0192143 | A1 | * | 7/2012 | Elaasar | G06F 8/35 717/104 |
| 2016/0217371 | A1 | * | 7/2016 | Leithiser | G06F 16/28 |
| 2017/0212829 | A1 | | 7/2017 | Bales et al. | |
| 2017/0243140 | A1 | * | 8/2017 | Achin | G06Q 10/06 |
| 2019/0171438 | A1 | * | 6/2019 | Franchitti | G06F 16/9538 |
| 2019/0361686 | A1 | * | 11/2019 | Gnazdowsky | G06F 8/65 |
| 2022/0214874 | A1 | * | 7/2022 | Jayapandy | G06F 8/77 |

OTHER PUBLICATIONS

Lin, Guanjun, et al. "Software vulnerability detection using deep neural networks: a survey." Proceedings of the IEEE 108.10 (2020): pp. 1825-1848. (Year: 2020).*

(Continued)

*Primary Examiner* — Satish Rampuria

(74) *Attorney, Agent, or Firm* — S. Scott Foster; Kowert, Hood, Munyon, Rankin & Goetzel, P.C.

(57) ABSTRACT

An aggregate representation of a collection of source code examples is constructed. The collection includes positive examples that conform to a coding practice and negative examples do not conform to the coding practice. The aggregate representation includes nodes corresponding to source code elements, and edges representing relationships between code elements. Using an iterative analysis of the aggregate representation, a rule to automatically detect non-conformance is generated. The rule is used to provide an indication that a set of source code is non-conformant.

20 Claims, 16 Drawing Sheets

(56) References Cited

OTHER PUBLICATIONS

Martin, Michael, Benjamin Livshits, and Monica S. Lam. "Finding application errors and security flaws using PQL: a program query language." Acm Sigplan Notices 40.10 (2005):pp. 365-383. (Year: 2005).*

Xu, Wei, et al. "Detecting large-scale system problems by mining console logs." Proceedings of the ACM SIGOPS 22nd symposium on Operating systems principles. 2009:pp. 117-131. (Year: 2009).*

Singh, Rishabh, Sumit Gulwani, and Armando Solar-Lezama. "Automated feedback generation for introductory programming assignments." Proceedings of the 34th ACM SIGPLAN conference on Programming language design and implementation. 2013.pp. 15-26 (Year: 2013).*

Bozinovic, Radmilo M., and Sargur N. Srihari. "Off-line cursive script word recognition." IEEE Transactions on pattern analysis and machine intelligence 11.1 (1989): pp. 68-83. (Year: 1989).*

Feng, Henry Hanping, et al. "Formalizing sensitivity in static analysis for intrusion detection." IEEE Symposium on Security and Privacy, 2004. Proceedings. 2004. IEEE, 2004.pp. 194-208 (Year: 2004).*

Gang Shu, et al., "JavaPDG: A New Platform for Program Dependence Analysis, " 2013 IEEE Sixth International Conference on Software Testing, Verification and Validation, pp. 408-415.

Jeanne Ferrante, et al., "The Program Dependence Graph and Its Use in Optimization," ACM Transactions on Programming Languages and Systems, vol. 9, N. 3, Jul. 1987, pp. 319-349.

Daniel Neider, et al., "Sorcar: Property-Driven Algorithms for Learning Conjunctive Invariants," Static Analysis Symposium 2019 (SAS 2019), pp. 1-24.

Wikipedia, "Conjunctive Normal Form," downloaded from https://en.wikipedia.org/wiki/Conjunctive_normal_form on Apr. 27, 2021, pp. 1-6.

* cited by examiner

```
...
74: List<XYZObjSummary> objSummaries = XYZClient.listObjects(bucket,
                                                    keyPrefix).getObjectSummaries();
75: for ( XYZObjSummary xos: objSummaries) {
76:     keys.add(....);
77: }
78: XYZClient.deleteObjects(new DeleteObjectRequest(bucket).withKeys(keys));
...
```
Section 510 of a code example
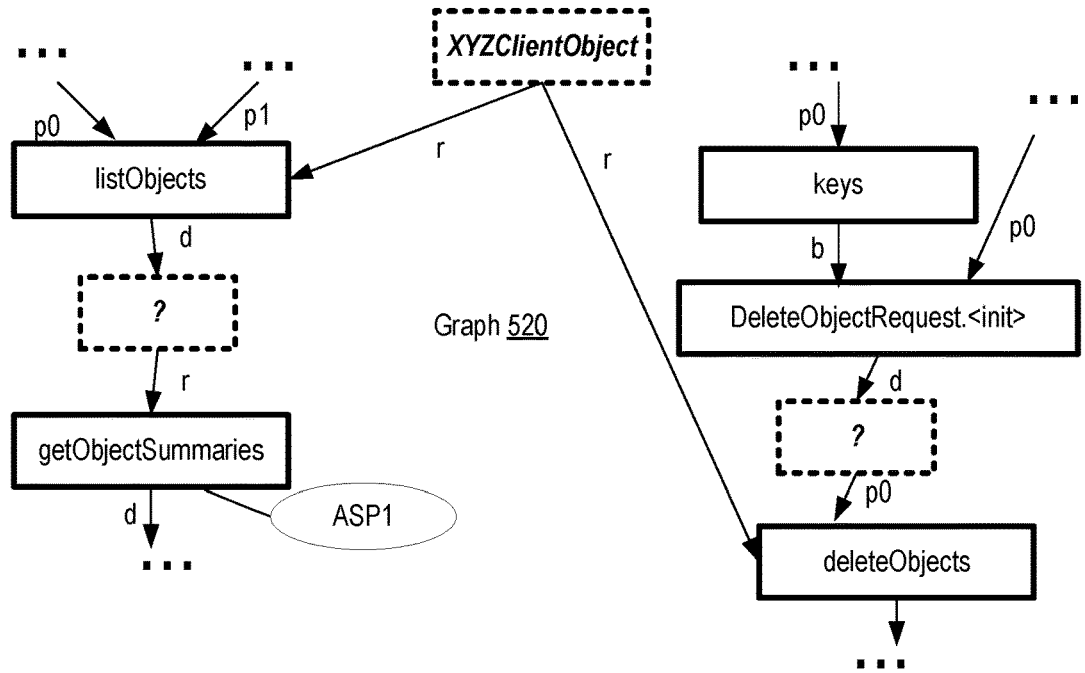
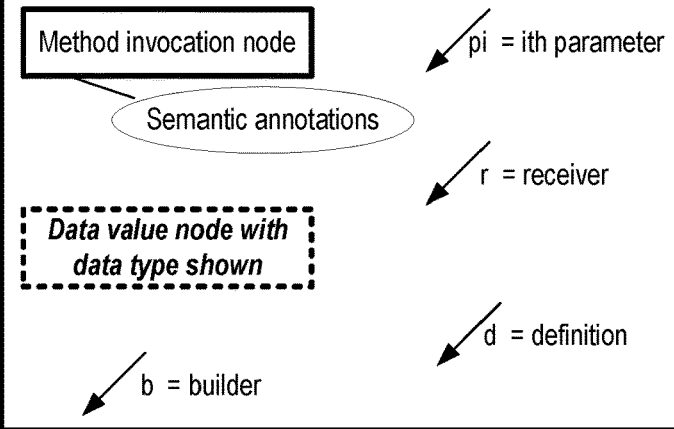
FIG. 5

```
 97: class SmallExample {
 98:
 99:    Value nonconforming_1(Foo f, String key)
100:    {
101:       Map m = f.getMap();
102:       Value value = m.get(key);
103:       return value;
104:    }
105:
106:    Value nonconforming_2(Foo f, String key) {
107:       Map m = f.getMap();
108:       return m.get(key);
109:    }
110:
111:    void conforming_1(Foo f, String s) {
112:       Map m = f.getMap();
113:       Value val = m.get(s);
114:       Clazz.compute(val);
115:    }
116:
117:
118:    void conforming_2(Foo f, String s) {
119:       Value val = f.getMap().get(s);
120:       Clazz.compute(val);
121:    }
122: }
```

Source code example pair collection 1000

*FIG. 10*

Graph 1200 (for nonconforming_2)

Graph 1300 (for conforming_1)

Graph 1400 (for conforming_2)

EXAMPLE-BASED SYNTHESIS OF RULES FOR DETECTING VIOLATIONS OF SOFTWARE CODING PRACTICES

BACKGROUND

Software development is a fast-evolving field, with new design patterns and even new languages often gaining widespread acceptance rapidly. Developers responsible for enterprise level software programs have to keep up with such technological advances, while also producing code quickly to keep up with demanding product release schedules. New developers in particular may sometimes find it difficult to implement all the recommended programming practices relevant to their tasks, which can potentially lead to poor application behavior. Even experienced developers may in some cases produce sub-optimal code which can negatively impact end users, and lead to hard-to-debug errors.

BRIEF DESCRIPTION OF DRAWINGS

FIG. 5 illustrates example nodes and edges of a graph representation of code which may be used for non-conformant code detection rule preparation, according to at least some embodiments.

FIG. 10, FIG. 11, FIG. 12, FIG. 13, FIG. 14 and FIG. 15 collectively illustrate a simple example of automated generation of a rule for detecting non-conformant code, according to at least some embodiments.

Figure 1:
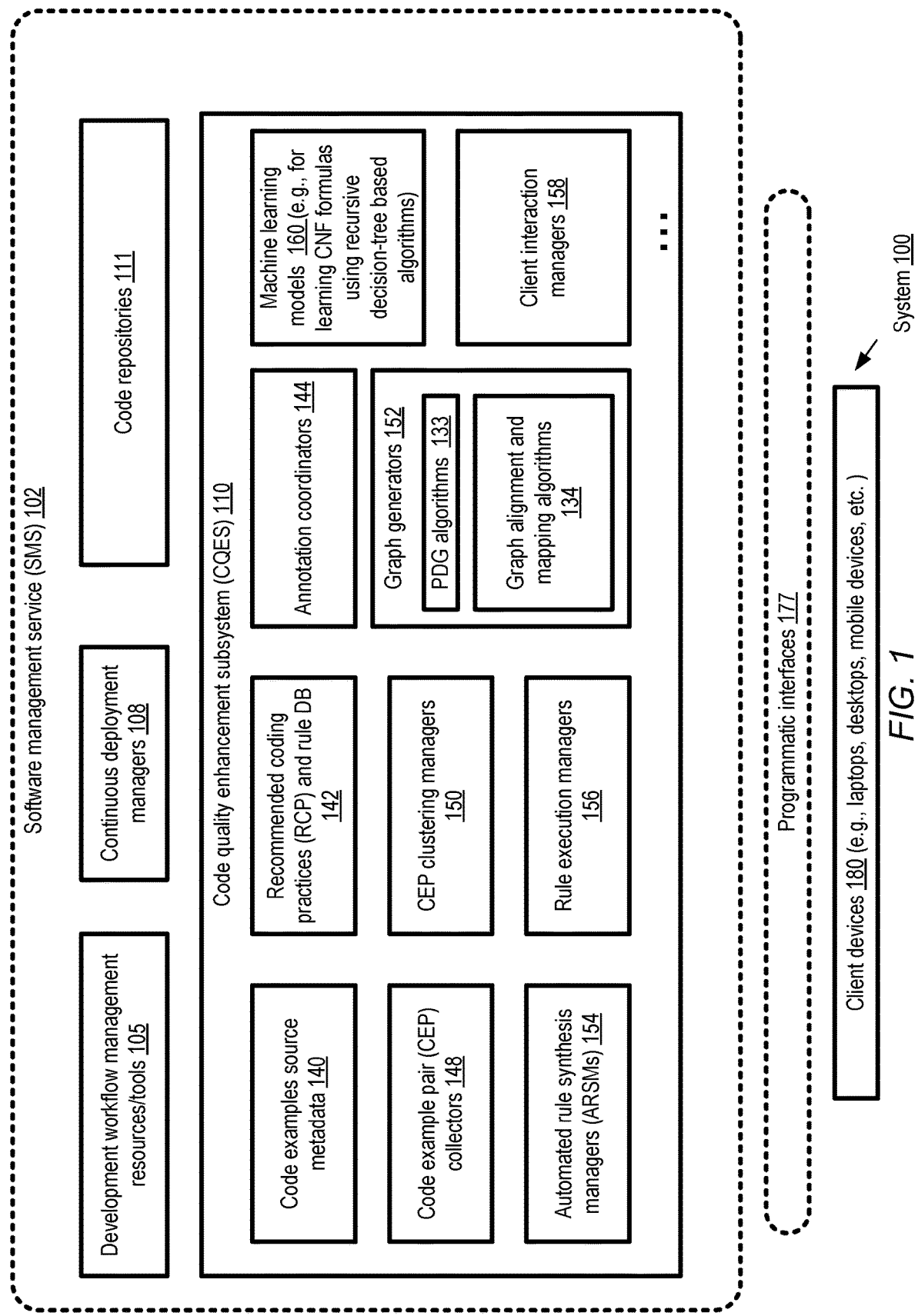
FIG. 1 illustrates an example system environment in which rules for identifying source code which does not follow recommended coding practices may be synthesized automatically from a small number of examples, according to according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for improving the quality of software by automatically generating and applying rules that can be used to identify violations of recommended or approved coding practices within source code. The recommended coding practices typically indicate techniques, identified by experienced software experts, for enhancing various aspects of software behavior. Recommended coding practices can include (but are not limited to) techniques for handling rare or unexpected events during execution without crashing or hanging, improving performance (e.g., increasing throughput or decreasing response times for various tasks being accomplished using the software), preventing/avoiding security breaches, and so on. Conformance with such practices typically cannot be detected purely on the basis of syntax analysis; that is, code that successfully passes syntax checking tests for the programming language being used may nevertheless be non-conformant with one or more recommended coding practices.

The process for the automated synthesis of the rule(s) for identifying potential violations of a recommended coding technique includes collecting a set of code example pairs, with each pair comprising a positive code example which conforms to (i.e., does not violate) the coding technique and a negative code example which does not conform to the coding technique. The negative (or positive) examples associated with a given coding practice may differ from one another in several ways—e.g., they may have been checked in to different portions of a source code tree for by respective developers with different coding styles and object naming approaches, they may have somewhat different control flows or data flows, and so on. Graph-based representations of the code pairs are created, which indicate logical relationships, including data flow relationships and control flow relationships, identified among code elements (such as variables, method/function invocations, call signatures of the methods/functions, loop constructs etc.) of the positive and negative examples. From the representations of the code example pairs, an aggregate representation corresponding to the recommended coding practice can be generated, which in effect captures respective sets of salient code features (including data flow and control flow properties) that are (a) common to both the negative and the positive examples (b) occur in the negative examples but not in the positive examples or (c) occur in the positive examples but not in the negative examples. The aggregate representation can then be analyzed, e.g., using machine learning techniques, to learn a set of Boolean predicates which make up one or more rule(s) for detecting non-conformance with the recommended coding practice.

The synthesized rule or rules can be applied at various stages of a software development workflow, e.g., during automated code reviews conducted with the help of a software management service of a provider network or cloud computing environment. A program or tool used to apply the rules may be referred to as a code non-compliance detector or a code non-conformance detector. If a violation or non-conformance with respect to a given recommended or approved computing practice is detected within a given section of source code, a developer responsible for that source code can be notified quickly, and in some cases can be provided detailed suggestions or recommendations to modify the code to conform to the approved computing practice. Similar rules can be generated and applied for numerous recommended coding techniques, thereby helping to improve the quality of the software being prepared for various applications and services. Only a few code example pairs may suffice to generate fairly sophisticated rules for any given recommended coding practice in many cases, so not much effort may be required to collect and label code examples for the proposed technique. In some cases, the quality of the rules synthesized can be further enhanced by obtaining (e.g., from the code developers or from other subject matter experts) additional semantic annotations for various elements of the graphical representations of individual examples, propagating this type of semantic information to the aggregate representations from which the rules are learned, and in some cases including the semantic information in the rule predicates. Note that at least in some implementations, the positive and negative examples that are analyzed to synthesize the rules may not necessarily be paired with one another—e.g., in a given collection of code examples used to synthesize a rule, there may be five positive examples and three negative examples.

The terms "recommended coding practice", "recommended coding technique", "approved coding practice", and "approved coding technique" may be used interchangeably to refer to methodologies for structuring and organizing a set of source code utilized to perform a given programming task or objective while reducing the probability of certain types of undesired behaviors during execution of the source code. Examples of such programming tasks/objectives can include, among others, performing computations on a set of input and providing the result of the computations to another set of source code while ensuring that errors or exceptions which may be encountered during the processing or the result transfer are handled correctly, storing a set of records in an efficient way, retrieving a set of results efficiently from a data source, searching or traversing a large data set, and so on. The granularity or scope of applicability of a recommended coding practice may vary; some of the practices may apply to methods or functions, others to source code files (e.g., class files in the case of programming languages like Java™), others to iterative constructs within methods/functions, and so on. Examples of source code at various granularity levels may be used for automatically synthesizing rules for detecting non-conformance with the recommended practices using the kinds of techniques described herein. The terms "non-conformance" and "non-compliance" are used interchangeably herein.

As one skilled in the art will appreciate in light of this disclosure, certain embodiments may be capable of achieving various advantages, including some or all of the following: (a) substantially enhancing the quality (e.g., including performance, error handling or exception handling capacity, security, etc.) of the software being utilized for numerous mission-critical enterprise-level applications in an automated manner, without requiring painstaking manual analysis of the code and/or (b) reducing the amount of computing, memory, storage, networking, and other resources that have to be devoted to code debugging and bug fixing, e.g., by reducing the probability of the introduction of bugs in the first place.

According to some embodiments, a system may comprise one or more computing devices. The computing devices may include instructions that upon execution on or across the computing devices cause the computing devices to obtain a collection of code example pairs (CEPs) associated with a recommended coding practice or technique. A given CEP of the collection may comprise a positive source code example and a negative source code example. The positive example may implement a recommended coding technique to achieve a programming objective; the negative source code example may be directed or targeted to achieving the same programming objective but may not utilize or implement the recommended coding technique. In some cases the negative source code example may not be able to achieve the intended programming objective, and may consequently have been flagged as a bug or defect. In other cases, the negative example may be able to achieve the programming objective, but may not do so in as performant a manner or as secure a manner as the positive example, or the negative example may not handle potential unexpected events or exceptions as well as the positive example. The code example pairs may be obtained from a variety of sources in different embodiments, such as bug fix check-ins directed to a code repository for which access permissions have been obtained from the developers or organizations whose code is stored at the repositories, web sites devoted to answering programming related questions, blog posts, interfaces provided by a software management service to developers to provide and annotate such examples, and so on.

A respective per-example transformed representation, such as a type of program dependency graph (PDG) may be created of at least some of the positive and negative code examples (e.g., one graph representing a positive example of a pair, and another graph representing the corresponding negative example). Such a per-example transformed representation may, for example, indicate at least a portion of a data flow within the example (e.g., the data that was produced as output by a given source code element, which other source code element(s) received/consumed that data, etc.), as well as at least a portion of a control flow (e.g., the sequence in which various statements were executed, the conditions that were checked to control iterations, etc.).

An aggregate representation (which may be referred to as a "super-graph", a "super-tree", a "hyper-graph" or a "hyper-tree") of the collection of code example pairs may be constructed in various embodiments, e.g., using the respective per-example representations as input to an alignment and mapping algorithm. In at least some embodiments, the aggregate representation may include a plurality of nodes and a plurality of edges with each edge linking a pair of nodes. The nodes may correspond to respective source code elements (e.g., names or signatures of methods/functions invoked, variable names and associated data types, etc.) present in at least some code examples of the collection. At least some edges linking a pair of nodes may represent a logical relationship or dependency detected between the respective source code elements corresponding to the two nodes of the pair, such as a data dependency or a control dependency in some embodiments. Metadata indicating how many (or which specific) positive examples have a given node or edge included in the aggregate representation, as well as how many (or which specific) negative examples have a given node or edge present in the aggregate representation, may also be stored in various embodiments, e.g., as part of the aggregate representation or in a separate data object.

According to some embodiments, the per-example representations may include semantic annotations for some source code elements, provided for example by developers to provide more insights about the source code elements. A semantic annotation may also be referred to as a semantic predicate. In embodiments in which PDGs are created for the examples, a respective semantic annotation may be added to one or more nodes or one or more edges of the PDG. One or more such semantic annotations may also be included in the aggregate representation derived from the per-example representations. Semantic annotations may include, for example, statements indicating whether a given source code section has an associated try-catch construct for exception handling, whether a result of an invocation of a method or function is checked to ensure that the result is non-null before an attempt is made to utilize the result or pass on the result to some other portion of code, and so on. In some cases, the semantic annotation for a node that is part of a per-example representation of a positive example of a code example pair may differ from the semantic annotation for a corresponding node that is part of the per-example representation of a negative example of the code example pair. In such a scenario, the aggregate representation may include both sets of semantic annotations, in effect indicating that "this is the additional semantic information available about a portion of the positive example of a code example pair" and "this is the (different) additional semantic information available about the corresponding portion of the negative example of the code example pair".

After the aggregate representation is generated for a given recommended coding technique or practice, in various embodiments the aggregate representation may be analyzed to synthesize a rule that can be used to detect whether a target set of source code includes one or more code examples which do not utilize the recommended coding technique. In at least some embodiments, the rule may comprise a plurality of Boolean predicates expressed in terms of one or more nodes, edges, and/or semantic annotations of the aggregate representation. In various embodiments at least a portion of the aggregate representation may be provided as input to one or more machine learning models or algorithms, such as decision-tree based algorithms for extracting conjunctive normal form (CNF) formulas or CNF representations of combinations of properties of the nodes and edges. According to some embodiments, the procedure for deriving the rule's predicates may comprise an iterative or recursive analysis, in that several different versions of the rule may be tried out and refined before one that can cleanly distinguish between all (or at least a majority) of the positive examples being considered and all (or at least a majority) of the negative examples being considered is found. Some of the predicates of a rule may be identified after a split is introduced into a decision tree used to generate the rule in at least some embodiments as part of the recursion. Such a split may be introduced, for example, if a determination is made that a proposed version of the rule which has been generated during the analysis completed thus far is insufficient to distinguish at least some positive source code examples from corresponding negative source code examples.

After a rule that can distinguish between the positive and negative examples available for the recommended coding technique is synthesized using the above approach, in various embodiments the rule may be stored as part of a database of rules being maintained and applied by a software management service or tool. Based at least in part on a result of applying the rule to a particular set of source code, an indication may be provided in some embodiments via one or more programmatic interfaces that the particular set of source code does not utilize or conform to the recommended coding technique. Other rules may be synthesized in an automated manner using an analogous example-based approach for checking conformance with different coding practices in various embodiments, added to the rule database, and used to further improve the quality of software being produced at various organizations. In at least some embodiments, a collection of code examples which is analyzed using the above-described techniques to automatically generate a rule for detecting non-conformance may comprise some number of positive examples and some number of negative examples which are not necessarily paired with the positive examples. For example, a collection of code examples from which an aggregate representation is generated and used to synthesize a rule may include M positive examples and N negative examples, where M is not equal to N, and at least one positive example is not paired with a corresponding negative example, or at least one negative example is not paired with a corresponding negative example.

In some embodiments, after permissions are obtained from the owners/developers of the code, a set of code check-ins directed to a code repository over some period of time (e.g., every day, or every week) may be analyzed to identify at least some of the code example pairs. For example, many of the code check-ins may be annotated as bug fixes, and the "before-bug-fix" version of the code checked in may in some cases represent an example of non-conformance with a recommended cording practice, with the "after-bug-fix" version representing an example of conformance with the recommended coding practice. Note that at least in some embodiments, a given recommended coding practice may not be explicitly identified or labeled as such; the very fact that a bug was found and fixed may indicate that the code that was changed was an example of poor coding, while the changed version represents an example of improved, approved (at least by the developer who checks in the code and/or by a code review process used for the check-in), and therefore recommended way of coding to achieve the same objective as the intended objective of the buggy code. In other embodiments, negative and corresponding positive versions of a set of code may be explicitly labeled as such, e.g., in a blog or a web site used for answering coding-related questions, and such sources may be mined to extract code example pairs for the technique described above.

Rules synthesized using the above-described methodology for detecting non-conformance with recommended coding practices may be applied at various points during the software development lifecycle in different embodiments. In some cases, such rules may be generated, stored and utilized at a software management service (SMS) of a provider network or cloud computing environment. Such an SMS may provide programmatic interfaces (e.g., web-based consoles, command-line tools, application programming interfaces (APIs) or graphical user interfaces similar to integrated development environments (IDEs)) for service clients such as software developers or software owners to submit requests/messages and receive corresponding responses. The programmatic interfaces may be used to provide labeled code example pairs by at least some software developers or other SMS clients interested in sharing their expertise in some embodiments. In one embodiment, a client of the SMS may submit a code review request indicating a particular set of source code via SMS interfaces, and the rules may be applied to that set of source code using the resources of the service. In some embodiments, the rules may be applied to a set of source code when a developer checks out (or "pulls") that source code from a repository, e.g., prior to making changes locally and checking the modified version back into the repository. In other embodiments, the rules may be applied when a developer checks in or "pushes" code into a repository, or requests compilation of a set of source code.

According to some embodiments, a similarity-based mapping algorithm, also referred to as a graph alignment or node alignment algorithm, may be used to generate the aggregate representation from the per-example representations. Such an algorithm may take various factors into account when identifying the elements (e.g., nodes or edges) of a negative per-example representation that have matching elements in the positive per-example representation. To map a first node (e.g., in a negative example's PDG) to a second node (e.g., in the corresponding positive example's PDG) at least a set of local properties of the nodes may be compared in various embodiments. Such properties may include (a) a name of an invoked method or function, (b) a number of parameters of a method invocation or function call, (c) a data type of a programming construct within which a method or function is defined (such as the receiver object of the method or function), (d) a number of nodes within a particular edge-count-neighborhood of the first node for which corresponding similarity-based mappings have already been identified within the particular edge-count-neighborhood of the second node, and so on. A greedy mapping algorithm that relies primarily on such local properties may be employed in at least one embodiment. In other embodiments, more complex algorithms which take properties of groups of nodes/edges into account together may be employed. In some embodiments, a linear optimization algorithm may be employed to generate the aggregate representation from a set of positive and negative code examples.

As indicated earlier, in at least some embodiments, synthesizing a rule may include learning a CNF (conjunctive normal form) formula for the rule. Any of a variety of algorithms for learning CNF formulas, such as algorithms based on clause elimination or variants of such clause elimination-based algorithms, may be employed in different embodiments. In some embodiments, machine learning models/algorithms may be employed for learning the formula from an aggregated representation; in other embodiments, machine learning may not be employed.

According to some embodiments, an SMS or tool that applies code non-conformance detection rules of the kind mentioned above may provide code improvement recommendations, e.g., in addition to providing notifications about detected instances of non-conformance. For example, after applying a rule R1 to a particular set of source code SCS1 and detecting non-conformance, a negative source code example NSCE1 which meets a similarity criterion to SCS1 may be identified, e.g., by analyzing the collection of code example pairs which were used to synthesize R1 and finding the negative example which is most similar to SCS1 in that collection. Similarity criteria based on the count of nodes with different properties, with respect to SCS1, in the graph representations of various negative examples may be used in some embodiments to identify NSC1. The positive example PSCE1 which was paired with NSCE1 may then be provided as part of an improvement recommendation for SCS1 in such embodiments, potentially simplifying the work required from the software developer working on SCS1.

In at least some embodiments, as indicated above, a software management service (SMS) at which non-conformance detection rules are synthesized starting with example code pairs may be implemented as part of a suite of services of a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include a virtualized compute service (VCS), software management services, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which rules for identifying source code which does not follow recommended coding practices may be synthesized automatically from a small number of examples, according to according to at least some embodiments. As shown, system 100 includes resources of a software management service (SMS) 102, including a code quality enhancement subsystem (CQES) 110, development workflow management resources/tools 105, continuous deployment managers 108, and one or more code repositories 111.

Rules of the kind introduced above, used for detecting non-conformance or violation of recommended or approved coding practices or techniques, may be synthesized and employed at the CQES 110 in the depicted embodiment. CQES 110 may include code example source metadata 140, indicating the kinds of techniques which are to be used to obtain code example pair collections (negative examples representing non-conformance, and corresponding positive examples representing conformance, with various recommended practices). Such techniques may include, for example, mining check-ins to code repositories such as repositories 111, after obtaining the needed permissions from the clients whose code is stored in the repositories 111, to identify check-ins that represent bug fixes. The code representing the bug fixes may be used as positive examples, with the buggy code that was fixed being used as the corresponding negative examples. In some cases, publicly-accessible repositories that are can be reached over the Internet may also be mined, again after obtaining any needed permissions. Metadata 140 may also indicate blogs, web sites and other publicly accessible sources of positive and negative examples in some embodiments. One or more code example pair (CEP) collectors 148 may be responsible for periodically searching for, and gathering, examples of code pairs that can be used for rule synthesis in the depicted embodiment, in accordance with the metadata 140.

According to some embodiments, after a set of code example pairs is obtained, e.g., by examining check-ins to a repository, the obtained examples may be grouped into collections of semantically similar examples before rules are synthesized from them. For example, at some large scale cloud-based SMSs, thousands of check-ins may be directed to a given code base on a given day by software developers distributed around the world, and most of the check-ins (even the bug-fix check-ins) may be completely unrelated to one another. To synthesize a given rule, related collections of positive and negative examples pertinent to the same type of programming objective and the same type of coding practice may first be identified automatically at the SMS, e.g., with the help of one or more CEP clustering managers 150 in the depicted embodiment. The clustering managers may analyze various aspects of the individual CEPs, such as their respective locations within a source code hierarchy (e.g., a package hierarchy in the case of languages similar to Java™), the kinds of changes made (e.g., the data types and APIs used, the classes of the methods/functions used), and so on. Based on such analysis, respective subsets of the CEPs may be placed into buckets, clusters or collections, for each of which a coherent rule or a coherent set of rules is likely to be useful. For some rules, clustering of CEPs may not be required, e.g., in scenarios where the set of CEPs potentially available to derive a rule is already labeled as being relevant to a single recommended coding practice (RCP), as may be the case when the examples are provided by a single developer or a group of developers, or obtained from a blog or web-site rather than a code repository.

In some embodiments, annotations containing semantic information (which may be referred to as semantic predicates) may be obtained for various sections of the code included in CEPs, and used in the process of creating the aggregate representations. One or more annotation coordinators 144 may be responsible for collecting such annotations, e.g., by submitting requests to software developers responsible for preparing the CEPs, by analyzing comments included in the CEPs, and so on.

In various embodiments, the process for generating or synthesizing a non-conformance detection rule for a given recommended coding practice (RCP) at SMS 102 may include generating per-example representations for the positive and negative examples of a collection of related CEPs. The overall process may be coordinated or orchestrated by one or more automated rule synthesis managers (ARSMs) 154 in the depicted embodiment. One or more graph generators 152 may be utilized by the ARSMs to produce the per-example representations in the depicted embodiment. The per-example representation for a given positive or negative code example of a CEP may, for example, indicate various aspects of one or more data flows within the code, and/or one or more control flows. In at least some embodiments, the per-example representations may include variants or versions of program dependency graphs (PDGs), produced by graph generators 152 using a set of PDG algorithms 133.

From the per-example representations of the collection of CEPs corresponding to a given RCP, in various embodiments, an aggregate representation may be constructed to capture salient features shared by both the positive and negative examples, the salient features of the positive examples alone, and the salient features present in the negative examples alone. A set of graph alignment and mapping algorithms 134 may be employed by the graph generators 152 in this phase of the analysis in various embodiments. The aggregate representation may include various nodes connected by edges, with the nodes representing code elements present in at least some of the CEPs of the collection and the edges representing dependencies (e.g., control dependencies or data dependencies) or other relationships among the code elements represented by the nodes.

The aggregate representation may be provided as input to one or more machine learning models 160 in the depicted embodiment, and the rule for the detecting non-conformance (or potential non-conformance) with respect to the RCP associated with the collection of CEPs being considered may be provided as the output of the machine learning models. The models 160 may implement recursive decision-tree based algorithms for learning conjunctive normal form (CNF) formulas for the rules in at least some embodiments. A given rule may comprise a conjunction of a plurality of Boolean predicates expressed in terms of the nodes, edges and/or annotations of the CEPs in various embodiments. A recursive or iterative analysis methodology may be used for learning the rule in the depicted embodiment, in which various versions of the rule are generated and tested until a version which can distinguish all the positive examples from all the negative examples is found. An initial version of a rule may be formulated using predicates derived from the negative examples whose nodes, edges or annotations are indicated in the aggregate representation in some embodiments. Some predicates may be identified in such an embodiment by analyzing an as-yet unexamined portion of the aggregate representation (e.g., comprising one or more nodes/edges/annotations of a positive example included in the aggregate representation) after splitting a decision tree, with the split being triggered by a determination that a currently-proposed version of the rule does not distinguish at least some positive examples from the negative examples.

After a rule which can distinguish between all the positive and negative examples of the CEP collection for an RCP is synthesized, the rule may be added (along with other information such as the set of SMS clients on whose behalf the rule can be employed) to a recommended coding practice and rule database 142 in the depicted embodiment. Because the SMS 102 may be employed to manage software of numerous organizations or clients, in at least some embodiments the rules derived on behalf of one client (e.g., using examples obtained from a source tree of the client) may not necessarily be shared with, or executed for, other clients.

One or more rule execution managers 156 may apply at least a relevant subset of the rules to source code sets provided by clients of the SMS 102 in the depicted embodiment at various points of time during the code development lifecycle. Numerous rules, synthesized using respective CEP collections associated with several recommended coding practices, may be stored in the database 142 and applied by the execution managers to a given set of source code in some embodiments in an effort to identify as many potential non-compliance instances as possible in the depicted embodiment.

The SMS 102 may implement a set of programmatic interfaces 177, such as web-based consoles, command-line tools, APIs, graphical user interfaces such as IDEs and the like in the depicted embodiment, which can be used by clients to submit messages and requests and receive corresponding responses. Clients of the SMS 102 (such as code developers, code designers or code owners) may submit requests, such as code review requests which result in the execution of one or more of the synthesized rules, from a variety of client devices 180 such as laptops, desktops, mobile devices and the like in various embodiments. Client interaction managers 158 may receive client messages/requests and do an initial level of processing of the messages before transmitting internal versions of the messages to other components of the CQES 110, such as rule execution managers 156 or ARSMs 154 in the depicted embodiment. If an apparent example of non-conformance with an RCP is detected, within a set of source code indicated by a client, using one or more synthesized rules, an indication of the non-conformance may be provided via programmatic interfaces 177 to the client in at least some embodiments. In some implementations, a recommendation to enhance/improve the non-conformant code also be provided, e.g., in the form of a positive code example which corresponds to a negative example which is similar to the code provided by the client.

The development workflow management resources/tools 105 may be used by SMS clients to automate various aspects of developing, building and testing application suites in the depicted embodiment. Continuous deployment managers 108 may be used to manage the transfer of executable versions of applications (generate using the resources/tools 105) to test and production environments indicated by clients in at least some embodiments. In some embodiments, at least some of the rules synthesized at the CQES 110 may be applied as part of the development and/or deployment workflows orchestrated using resources/tools 105 and continuous deployment managers 108. For example, in one embodiment in which a nightly build of an application suite is prepared using resources/tools 105 once every 24 hours, all the code checked in during the previous 24 hours into the source tree for that application suite may be analyzed using at least s subset of the rules in rule DB 142 (e.g., if the code has not already been checked using the rules during code reviews).

Figure 2:
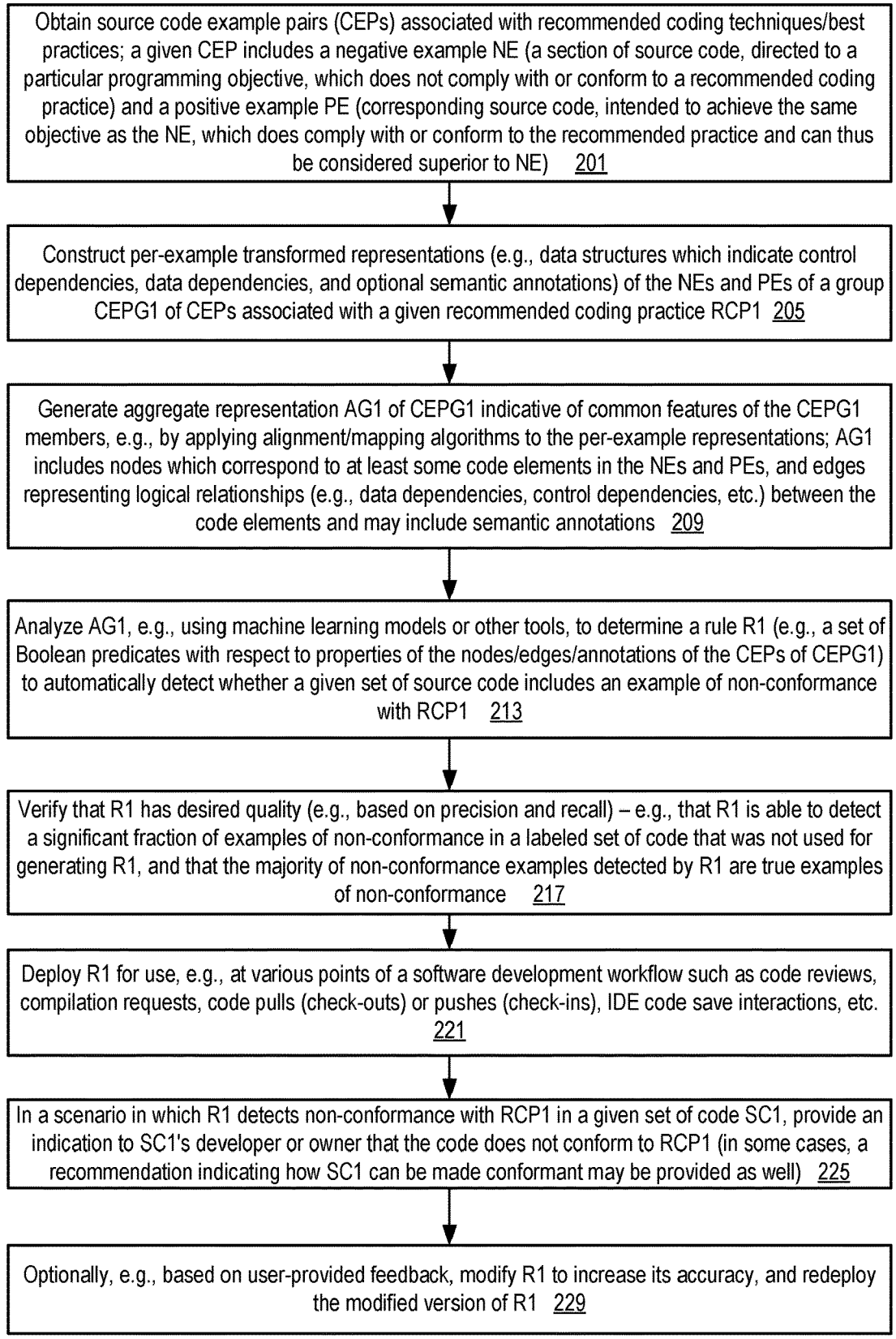
FIG. 2 is a flow diagram illustrating aspects of operations that may be performed to automatically generate detectors for code that does not conform to recommended coding techniques, according to at least some embodiments.

FIG. 2 is a flow diagram illustrating aspects of operations that may be performed to automatically generate detectors for code that does not conform to recommended coding techniques, according to at least some embodiments. As shown in element 201, source code example pairs (CEPs) associated with recommended coding techniques or best practices may be obtained or collected, e.g., at a software management service similar in functionality to SMS 102 of FIG. 1. A given CEP may include a negative example NE and a positive example PE. The NE may comprise a section of source code of one or more programs, intended to achieve a particular programming objective, which does not comply with or conform to a recommended coding practice, while the PE may comprise a section of source code intended or targeted to achieve the same programming objective, but does conform to the recommended coding practice and can thus (from the perspective of compliance with the recommended coding practice) be considered superior to NE.

A group or collection CEPG1 of CEPs associated with a given recommended coding practice RCP1 may be analyzed together in various embodiments. Per-example transformed representations may be constructed of the NEs and the PEs of CEPG1 (element 205). In at least some embodiments, the per-example transformed representations may comprise data structures which indicate control flows or control dependencies between various code elements (statements, method invocations etc.) of the PEs and the NEs, as well as data flows or data dependencies (e.g., how various data structures or variables are produced and where they are consumed). In one embodiment, the data structures may be enhanced in that portions of the data structures may be annotated with semantic information, e.g., by software developers or other subject matter experts, such as whether a given portion of the code represents a case where an exception is being handled, whether a return value of a function is being checked to ensure that it is not null before it is being used, etc. The data structures for the per-example representations used may include trees, graphs and the like in some embodiments.

An aggregate representation AG1 of CEPG1 may be generated in some embodiments, indicative of features that are common among at least some PEs and NEs, features that are shared among at least some PEs but not NEs, and features that are shared among at least some NEs but not PEs (element 209). Any of various types of graph alignment algorithms or node mapping techniques may be applied to the per-example data structures or representations in different embodiments to produce AG1. In various embodiments, AG1 may include nodes corresponding to at least some code elements in the NEs and PEs of CEPG1, and edges representing logical relationships (e.g., data or control dependencies) between the code elements. AG1 may also include semantic annotations derived from corresponding annotations in the NEs and PEs in some embodiments.

The aggregate representation AG1 may then be analyzed to determine or synthesize a rule R1 (e.g., a set of Boolean predicates with respect to the nodes, edges or annotations of the CEPs of CEPG1) which can automatically detect whether a given set of source code includes an example of non-conformance with RCP1 (element 213). In some implementations, AG1 (and/or CEP1) may be providing as input to one or more machine learning models or other analytics tools to learn R1.

In some embodiments, R1 may be evaluated using source code that was not used in deriving R1, e.g., to ensure that domain experts such as experienced software developers agree that R1 has desired levels of quality (e.g., using metrics such as precision and recall) (element 217). For example, to approve R1 for further use, a majority (or at least a significant fraction) of non-conformance examples detected by R1 may have to be verified as being true examples of non-conformance, and R1 may have to detect a significant fraction of examples of non-conformance within the code that is used for the evaluation. Labeled/annotated code examples which were not used to generate R1 may be used to evaluate the quality of R1 in various embodiments.

If approved, R1 may be deployed for use (element 221) at various points of a software development workflow. For example, R1 may be applied to various sets of code during code reviews requested by clients of an SMS, in response to compilation requests by developers, during code pulls (check-outs) and/or code pushes (check-ins), and/or during interactions of developers with IDEs (e.g., if/when a developer saves their code using an IDE).

In a scenario in which R1 detects non-conformance with RCP1 in a given set of code SC1, an indication may be provided programmatically to the developer or owner of SC1 that the code does not conform to RCP1 (element 225). In some embodiments, a recommendation as to how SC1 may be modified to make SC1 conformant with RCP1 may be provided as well, e.g., by transmitting or presenting a PE that may be used as a guideline for changing SC1.

Optionally, in some embodiments, based for example on feedback received from users such as software developers or owners, R1 may be modified to increase its accuracy, and the modified version of R1 may be redeployed (element 229). Similar operations to those described with respect to RCP1 may be performed for numerous other recommended coding practices, such that a collection of rules can be applied to a given set of software to ensure that it does not violate any of the RCPs.

Figure 3:
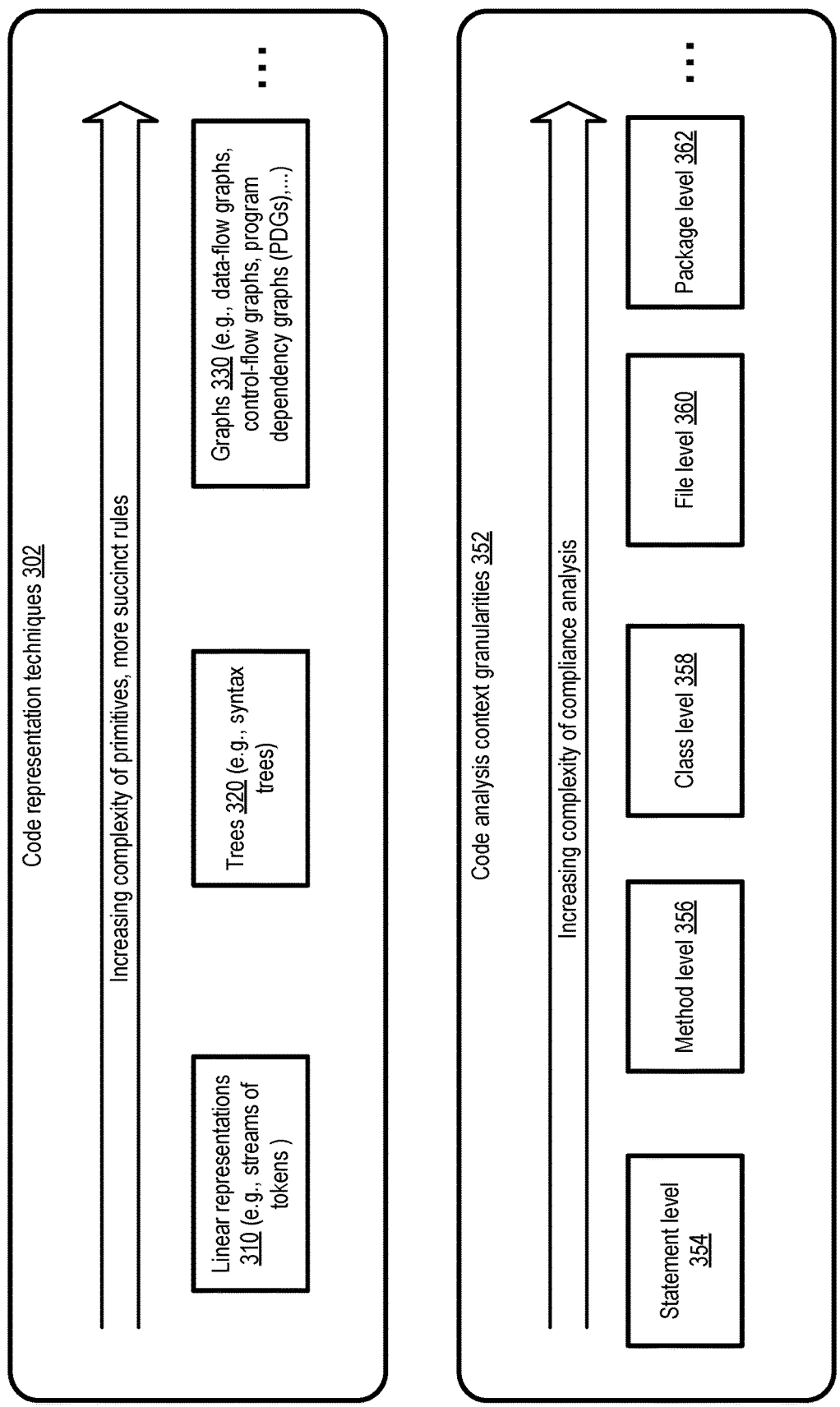
FIG. 3 illustrates example categories of code representation techniques used for non-conformant code detection, as well as example granularities at which code may be analyzed for non-conformance with recommended practices, according to at least some embodiments.

In different embodiments, positive and negative source code examples may be transformed for further analysis with respect to non-compliance with recommended coding practices using any of a variety of techniques. FIG. 3 illustrates example categories of code representation techniques used for non-conformant code detection, as well as example granularities at which code may be analyzed for non-conformance with recommended practices, according to at least some embodiments. Code representation techniques 302 may include, in order of increasing complexity of the primitives that can be represented, linear representations 310 (e.g., streams of text tokens), trees 320 (such as syntax trees) and graphs 330 (e.g., data-flow graphs, control-flow graphs, program dependency graphs (PDGs) and the like). In general, more succinct rules may be generated as the complexity of the representation increases from left to right. In at least some embodiments, as discussed above, positive and negative examples may be represented using graphs, and the graphs may then be aggregated to synthesize the rules.

The granularity at which source code may be analyzed for non-conformance with recommended coding practices may differ in different embodiments. Example code analysis context granularities 352 which may be employed in some embodiments may include statement level 354, method level 356, class level 358, file level 360 and package level 362. As the granularity becomes coarser from left to right in the figure, the complexity of analyzing the code for compliance may typically, as more relationships between elements of the code may have to be considered. In at least some embodiments, method-level granularity 356 may be utilized for non-compliance analysis to keep the amount of computation required to synthesize a given rule relatively small; that is, the set of code which implements a method or function may be analyzed together. In other embodiments, source code may be analyzed at granularities other than method-level granularity.

Figure 4:
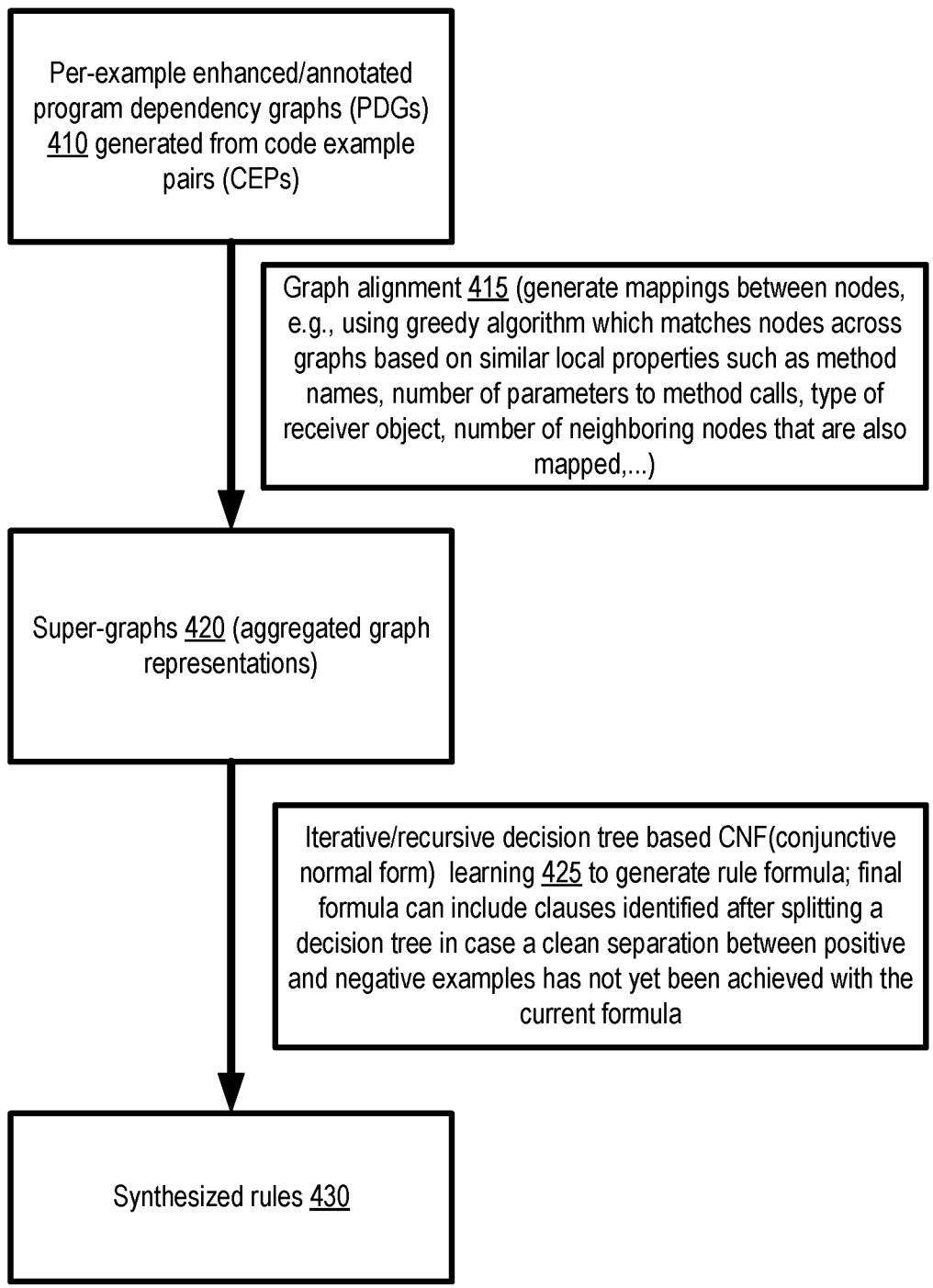
FIG. 4 illustrates an overview of graphical code analysis and machine learning techniques that may be applied to generate rules for detecting non-conformant code, according to at least some embodiments.

FIG. 4 illustrates an overview of graphical code analysis and machine learning techniques that may be applied to generate rules for detecting non-conformant code, according to at least some embodiments. From a collection of positive (i.e., compliant) and negative (i.e., non-compliant) examples associated with a given code practice, a set of per-example enhanced/annotated program dependency graphs (PDGs) 410 may be automatically generated in the depicted embodiment. Depending on the programming language used for the examples, any of a variety of open source tools/algorithms or custom tools/algorithms developed at a software management system (SMS) may be used to construct a set of baseline PDGs. The PDGs may be enhanced, e.g., by including new types of relationship information such as builder relationships (discussed further in the context of FIG. 5 below) and semantic annotations for at least some of the nodes or edges in one embodiment.

Algorithms for graph alignment 415 may be used to generate mappings between nodes and/or edges in the PDGs in the depicted embodiment, with the mappings in turn being used to produce aggregate representations of the PDGs, referred to as super-graphs 420. The mappings may identify similar nodes and/or similar edges in the different PDGs, so that features or properties which are common to both positive and negative code examples, features that only occur in negative examples, and features that only occur in positive examples can be listed. In one embodiment, a greedy alignment algorithm may be used for mapping nodes. In a greedy approach, the focus is primarily on identifying similarities using local properties of the nodes such as the method names represented by the nodes, the number and/or data types of parameters of method calls, the data types of the receiver objects (the parent objects within whose scope a given method represented as a node is defined), the number of "neighboring" nodes of a given node (where a neighboring node is defined as one that can be reached in the PDG by traversing fewer than a threshold number of edges) that have also been mapped to other nodes, and so on. In other embodiments, mapping/alignment algorithms which do not rely as much on local properties, but also take properties of groups of related nodes into account, may be used. Different mapping algorithms can lead to synthesis of different rules starting from the same set of PDGs. In various embodiments, mapping algorithms that preserve as much information as possible about the PDGs may be utilized. In some embodiments, linear optimization algorithms may be used to generate the super-graphs.

A super-graph 420, which may be constructed iteratively by adding nodes and edges identified as "mapped" to one another, may include at least some nodes and edges which are also present in one or more of the PDGs in some embodiments. The super-graph may also include semantic annotations transferred from the PDG nodes and/or edges in various embodiments. The nodes may represent code elements, and the edges may indicate logical relationships between the code elements represented by the node pairs which are linked by the edges. In effect, the super-graph may represent code features that are similar among as many positive examples of the available CEPs as possible, as well as code features that are similar among as many negative examples of the available CEPs as possible. Given a PDG, the set nodes or edges of the PDG that are present in the super-graph may be found quickly in various embodiments. It may also be quickly determined whether of a node of the super-graph has the same semantic annotation as a corresponding node in a PDG.

After a super-graph 420 is generated, iterative/recursive decision tree based CNF (conjunctive normal form) learning 425 may be performed to generate the formula for a rule that can be used to detect instances or occurrences of non-conformant code in the depicted embodiment. In various embodiments, a given synthesized rule 430 may comprise a plurality of Boolean predicates expressed in terms of local node properties, data flow properties, control flow properties and/or the kinds of information stored in the semantic annotations. In at least some embodiments, a first version of a rule may be derived as a conjunction of properties of negative examples. New versions of the rule may be generated iteratively, if the current version is found to be insufficient to distinguish between all the positive and negative examples available in such embodiments. A decision tree split may be introduced if the current rule is found insufficient, and additional formula terms or predicates may be learned by analyzing a new portion of the super-graph (which may include nodes/edges found in positive examples as well as negative examples) in various embodiments.

FIG. 5 illustrates example nodes and edges of a graph representation of code which may be used for non-conformant code detection rule preparation, according to at least some embodiments. In the depicted example, portions of a graph 520 which may be generated for a section 510 of a code example (which may be either a non-conformant example or a conformant example with respect to a given coding practice) are depicted to illustrate some of the kinds of elements which may be included in per-example graphs used for generating rules. In line 74 of section 510, an API XYZClient.listObjects is invoked. In lines 75-77, a for loop is executed and in line 78, API XYZClient.deleteObjects is invoked.

Notation key 564 indicates the different types of elements included in the graph 520. Rectangles with small-dash line boundaries represent data value nodes, with the data type (if known) shown within the rectangle. For example, XYZClientObject is the data type of a value or object from which listObjects and deleteObjects is invoked. The two small-dash rectangles with question marks indicate values whose data types are not known. Rectangles with dark (un-dashed) lines as boundaries, indicate method call invocations, with the name of the method used as the label for the rectangles. Thus, listObjects, getObjectSummaries, keys, DeleteObjectRequest<init> (the initialization method or constructor for DeleteObjectRequest) and deleteObject are the names of the methods invoked. Four types of edges are shown in graph 520 using arrows: parameter edges (where pi represents the ith parameter of a method), receiver edges labeled with the letter r, definition edges represented by the letter d, and builder edges labeled by the letter b. A receiver edge may indicate the context within which a method is invoked—for example, because deleteObjects is invoked as a method of XYZClient, a receiver edge leads from the XYZClientObject node to the deleteObjects node. A definition edge may represent the defining of a value (such as the value of an unknown data type which is created as a result of the listObjects method, from which the getObjectSummaries method is then invoked). A builder edge may indicate an entity which is used in a constructor or initialization method, such as the keys object which is used during the DeleteObjectRequest.<init> method. Annotated semantic predicates associated with method invocation nodes are represented as ellipses—for example, ASP1 indicates an annotated semantic predicate associated with the getObjectSummaries method. Other types of elements may be included within the per-example graphs in some embodiments than those shown in FIG. 5.

Figure 6:
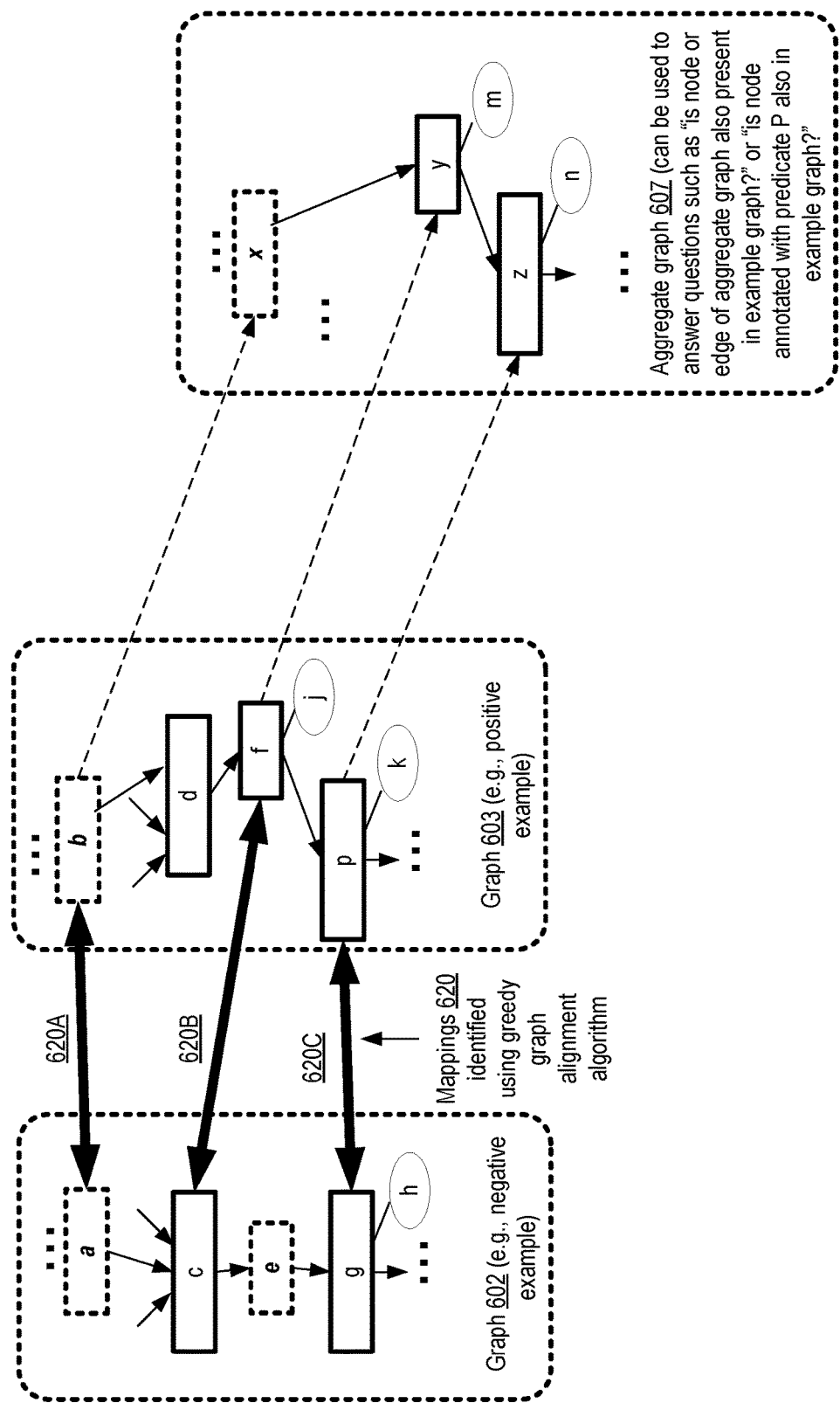
FIG. 6 illustrates an overview of preparation of aggregate representations of source code examples by generating similarity-based mappings from per-example graphs, according to at least some embodiments.

FIG. 6 illustrates an overview of preparation of aggregate representations of source code examples by generating similarity-based mappings from per-example graphs, according to at least some embodiments. In the depicted example, mappings 620 are identified between nodes of a graph 602 (which may represent a negative example of a code example pair) and nodes of a graph 603 (which may represent the corresponding positive example). The mappings may, for example, be indicative of similarities or common features among pairs of nodes in the two graphs. In some embodiments, a greedy graph alignment algorithm may be used, which focuses on similarities of local node properties such as shared names of an invoked method or function, the number of parameters of a method invocation or function call, a data type of a programming construct within which a method or function is defined (e.g., as indicated by a receiver relationship), and/or a number of nodes within a particular edge-count-neighborhood of a node of graph 602 for which corresponding similarity-based mappings have been identified within the particular edge-count-neighborhood of the corresponding node of graph 603.

Figure 7:
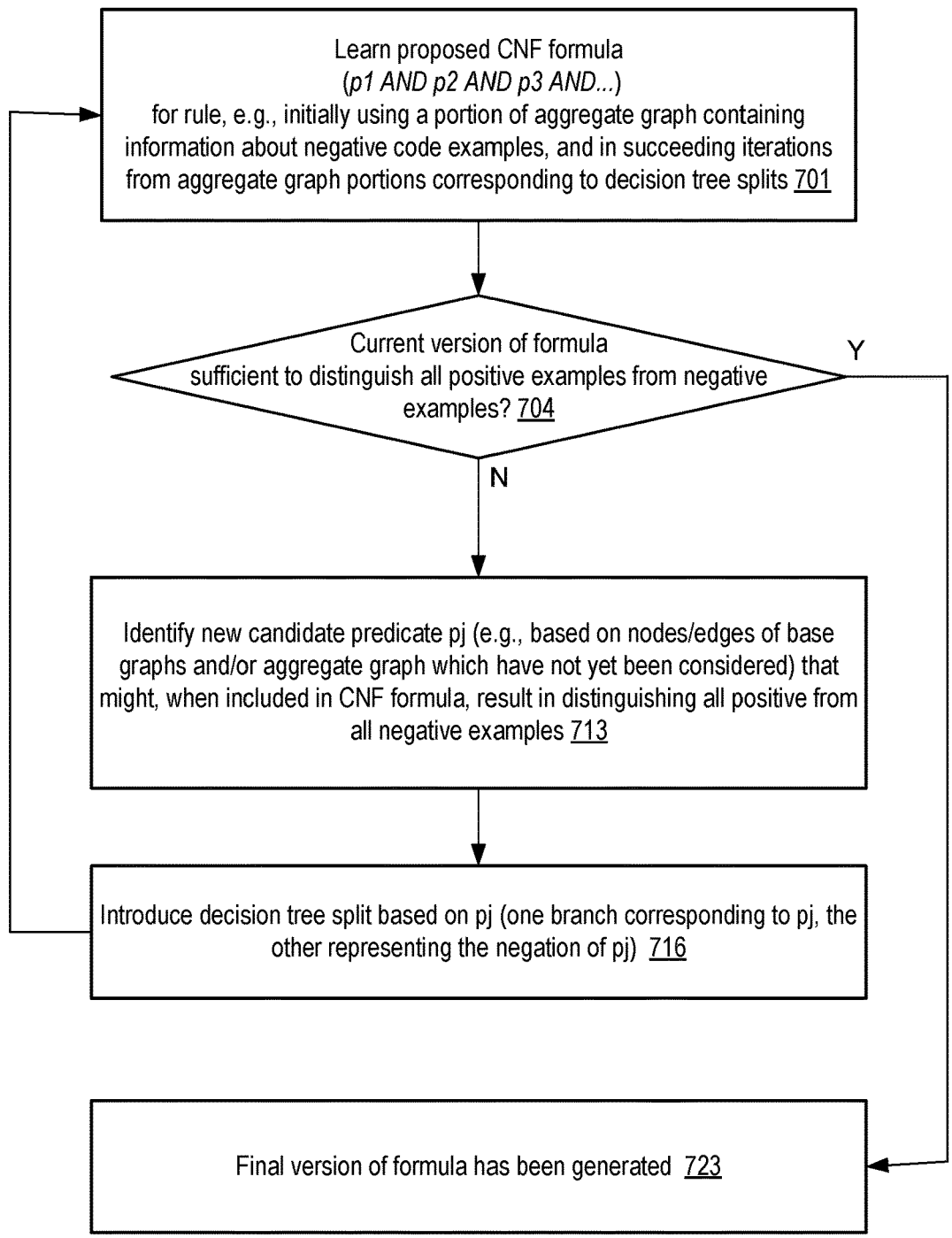
FIG. 7 is a flow diagram illustrating aspects of operations that may be performed as part of a recursive technique for generating non-conformant code detection rules using an aggregate representation of source code example pairs, according to at least some embodiments.

In the example scenario depicted in FIG. 6, a mapping 620A identified between node a of graph 602 and node b of graph 603 leads to the inclusion of node x in an aggregate graph 607. Mapping 620B identified between node c of graph 602 and node f of graph 603 leads to the inclusion of node y in the aggregate graph. Semantic annotations m are added to node y based at least in part on the semantic annotations j assigned to node f. Node z is included in aggregate graph 607 based on mapping 620C identified between node g of graph 602 and node p of graph 603. Semantic annotations n are added to node z based at least in part on semantic annotations h of node g and semantic annotations k of node p. In at least some embodiments, metadata associated with the aggregate representation may indicate which of its nodes, edges and/or semantic annotations are present in which specific positive or negative example graphs, so that FIG. 7 is a flow diagram illustrating aspects of operations that may be performed as part of a recursive technique for generating non-conformant code detection rules using an aggregate representation of source code example pairs, according to at least some embodiments. In the embodiment depicted in FIG. 7, a rule for detecting non-compliance with a particular recommended coding practice may be synthesized from the aggregate representation, starting with a CNF (conjunctive normal form) formula representing properties of negative examples that are represented in the aggregate representation. As indicated in element 701, the initial version of the rule may include Boolean predicates p1, p2, p3, etc., with each predicate representing a respective property of negative examples, and with the predicates connected via AND operators in the depicted embodiment. In effect, the initial version of the rule attempts to identify non-conformant code within a target source code set TSC by checking the equivalent of ("if property x1 of negative examples indicated in the aggregate representation is true of TSC" AND "if property x2 of negative examples indicated in the aggregate representation is true of TSC" AND . . . ). In subsequent iterations of the recursive technique, other portions of the aggregate representation (which may include information about positive examples, and not just negative examples) which has not yet been considered may be examined as well in the depicted embodiment.

If the current version of the rule formula is sufficient to distinguish all the negative examples from all the positive examples of the set of code example pairs available for the recommended coding practice (as detected in operations corresponding to element 704), a determination may be made that the final version of the formula has been generated (element 723). The final formula may then be saved in a repository of rules, and the rule may be applied to new sets of source code as needed as discussed earlier.

If the current version of the rule formula is not sufficient to distinguish all the negative examples from all the positive examples of the set of code example pairs (as also detected in operations corresponding to element 704), a new candidate Boolean predicate pj may be identified in the depicted embodiment (element 713), such that if the new predicate is added to the formula, it may become possible to use the new version of the formula to distinguish all positive examples from all negative examples. A split may be introduced in a decision tree used to represent the various versions of the formula (element 716), with one branch corresponding to pj and one branch corresponding to the negation of pj in the depicted embodiment. A new or modified CNF formula may then be learned corresponding to each branch resulting from the split in operations corresponding to element 701, and the new version may be checked to see whether it is sufficient to distinguish the positive examples from the negative ones. In effect, additional or remaining portions of the aggregate graph may be considered after each split, until either a satisfactory rule formula is found or (as may happen in some cases) all the information included in the aggregate representation has been considered.

In some embodiments, if a rule that can clearly separate the positive examples from the negative examples cannot be found after exhaustive analysis of the current aggregate representation, a new aggregate representation may be generated using a modified approach (which, for example, takes non-local node properties or non-local edge properties into account, or which uses additional semantic annotations) for combining the information contained in the positive and negative examples. The recursive technique illustrated in FIG. 7 may then be applied to the new aggregate representation. It is noted that in various embodiments, some of the operations shown in FIG. 2 or FIG. 7 may be implemented in a different order than that shown in the figure, or may be performed in parallel rather than sequentially. Additionally, some of the operations shown in FIG. 2 and/or FIG. 7 may not be required in one or more implementations.

Figure 8:
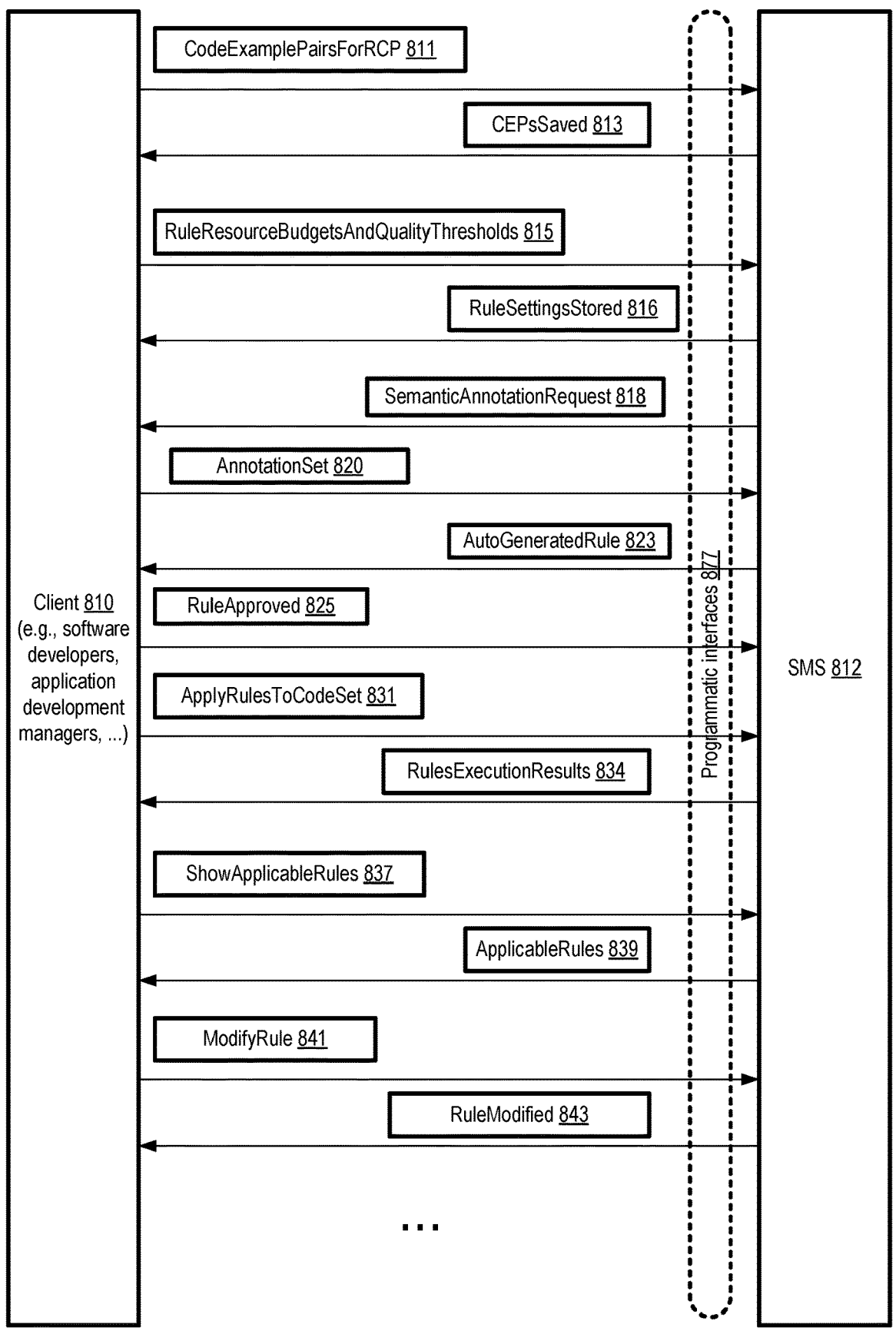
FIG. 8 illustrates example programmatic interactions between clients and a software management service at which non-conformant code may be detected using automatically synthesized rules, pertaining to the use of virtualized security devices at compute instance, according to at least some embodiments.

FIG. 8 illustrates example programmatic interactions between clients and a software management service at which non-conformant code may be detected using automatically synthesized rules, pertaining to the use of virtualized security devices at compute instance, according to at least some embodiments. In the embodiment shown in FIG. 8, a software management service (SMS) 812, similar in features and functionality to SMS 102 of FIG. 1, may implement a set of programmatic interfaces 877 which may be used by SMS clients 810 (such as software developers, software designers, software development project managers and the like) to interact with the SMS. The programmatic interfaces 877 may include, for example, web-based consoles, command-line tools, APIs, and/or graphical user interfaces (e.g., interfaces similar to IDEs) in various embodiments.

Using the programmatic interfaces, a client 810 may submit one or more CodeExamplePairsForRCP messages 811, containing positive and negative examples of code to be used for synthesizing non-conformance detection rules for a specified recommended coding practice on the depicted embodiment. The provided code example pairs may be stored in a repository maintained by the SMS 812, and a CEPsSaved message 813 acknowledging receipt of the code may be sent to the client in at least some embodiments. In one embodiment, a client 810 may use programmatic interfaces 877 to provide hints to the SMS 812 that may be useful in extracting positive and negative examples—e.g., the client may indicate specific line numbers or ranges of line numbers within a large set of code at which negative or positive examples are likely to be present.

According to some embodiments, a client 810 may indicate thresholds (e.g., for precision, recall and/or other quality metrics) to be used to verify the accuracy and effectiveness of the rules to be used for any of the client's own code (or code of an organization to which the client belongs), as well as resource budgets for the process of generating rules and/or applying rules on behalf of the client. Ensuring that any rules applied to the client's code meet specified quality criteria may, for example, avoid wasting developer time that may otherwise have been devoted to analyzing erroneous reports of non-conformant code (in the case of false positive identifications of non-conformance). Such thresholds and resource budgets may be provided to the SMS in one or more RuleResourceBudgetsAndQualityThresholds messages 815 in the depicted embodiment. The client preferences regarding budgets and quality thresholds may be stored at the SMS, and a RuleSettingsStored message 816 may be sent to the client in some embodiments.

In one embodiment, e.g., in a scenario in which code examples are collected automatically by examining check-ins to repositories, a client may be requested to examine some code examples and provide semantic annotations for corresponding per-example graphs. In such an embodiment, a SemanticAnnotationRequest 818 may be sent to one or more clients 810 from the SMS via programmatic interfaces 877. If the client is willing to provide annotations, one or more AnnotationSet messages 820 may be used to send the SMS the semantic annotations prepared by the client.

In some embodiments, after a rule has been synthesized using the techniques described above, the SMS 812 may notify a client on whose behalf the rule was prepared that the rule is ready, e.g., using an AutoGeneratedRule message 823. The AutoGeneratedRule message may, for example, include an annotated representation of the Boolean predicates used for detecting non-compliance, as well as one or more positive and negative examples. A client may send a RuleApproved message 825 to the SMS in one embodiment, indicating that the auto-generated rule appears to be acceptable, and can be added to the set of rules which will be used to check the quality of code prepared by the client or the client's organization. If the synthesized rule does not appear acceptable, the client may utilize the programmatic interfaces to indicate proposed changes to the rule to make it acceptable (e.g., using a ModifyRule message 841 as discussed below), or request that the rule not be utilized in some embodiments.

A client 810 may submit an ApplyRulesToCodeSet request 831 in some embodiments, requesting that a set of rules (either all the rules synthesized and stored for the client at the SMS, or a specified subset of the rules) be applied to a particular set of source code. In some embodiments, the equivalent of an ApplyRulesToCodeSet request may be implicitly acted upon by the SMS in response to various interactions of the client with the SMS, such as when the client submits a code review request, checks in code, checks out code, requests compilation of a set of source code, or clicks on an interface element (such as "Save and check for code compliance") of an IDE provided by the SMS; that is, a client may not necessarily have to send a special request to apply the rules, and may simply rely on automated execution of rules at various points during the software development lifecycle managed with the help of the SMS. Results of applying the rules may be sent to a client in one or more RulesExecutionResults messages 834 in some embodiments. The results may include indications of where in the client's code instances of non-conformance with recommended coding practices were found (if any such instances are found) in various embodiments. In some cases, recommendations as to how to go about fixing the code (i.e., making the code compliant) may be provided to the client, e.g., in the form of positive examples. In at least one embodiment, the SMS may automatically generate a candidate compliant version of the client's code using the positive examples stored earlier, and present the candidate compliant version to the client for approval. In some embodiments, if no non-compliance instances are detected in the client's code, a message indicating this may be included in the RulesExecutionResults message 834. For example text similar to "Congratulations: 423 rules for compliance were applied to your code, and your code passed all 423 tests!" may be included.

In some embodiments, a client 810 may submit a ShowApplicableRules request 837 to obtain the set of rules which are applied (or have been applied) to the client's code. An ApplicableRules message 839 may be sent in response in such embodiments, summarizing the rules which apply to the client's code.

According to at least some embodiments, a client may propose changes to an auto-generated rule of the SMS, e.g., via one or more ModifyRule messages 841. Such a change may, for example, remove a Boolean predicate from a rule's formula, add a Boolean predicate, or change contents of one or more predicates. The proposed change may be applied at the SMS, and a RuleModified message 843 may be sent to the client in the depicted embodiment. The modified version of the rule may subsequently be applied to various sets of source code to determine whether the source code conforms to the recommended coding practice for which the rule was synthesized, and code developers/owners may be informed if non-conformance is detected. In some embodiments, programmatic interactions associated with automatic synthesis and generation of non-compliance checking rules other than those shown in FIG. 8 may be supported by an SMS 812.

Figure 9:
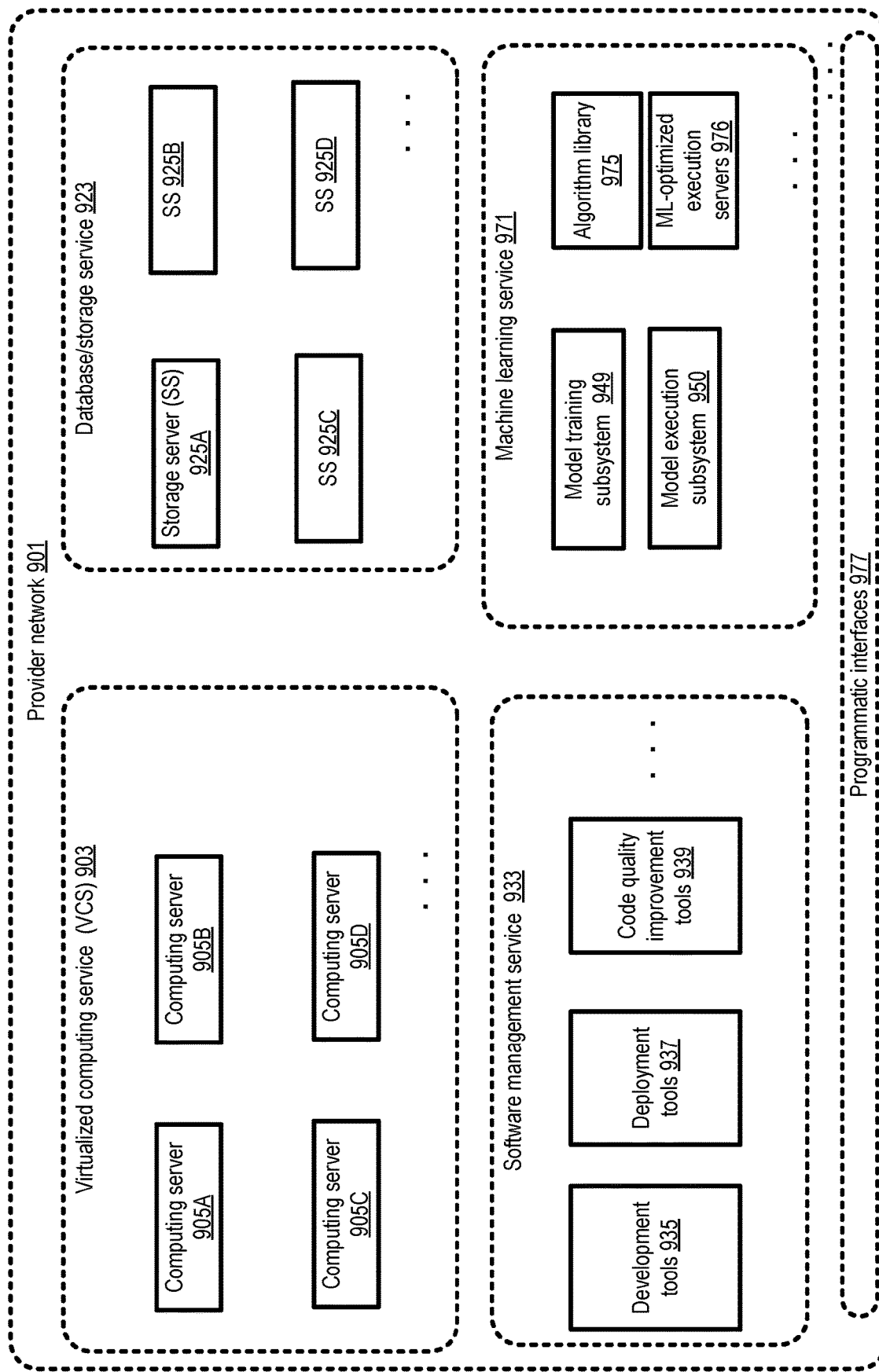
FIG. 9 illustrates an example provider network environment, according to at least some embodiments.

FIG. 9 illustrates an example provider network environment, according to at least some embodiments. In the depicted embodiment, provider network 901 may comprise resources used to implement a plurality of services, including for example a virtualized computing service (VCS) 903, a database/storage service 923, a machine learning service 971 as well as a software management service 933.

The software management service 933 may include code development tools 935, code deployment tools 937 as well as code quality improvement tools 939 which can be utilized for automated synthesis and execution of rules of the kind described above. The machine learning service 971 may comprise algorithm library 975, model training subsystem 949 at which various types of models (including the kinds of models for synthesizing non-conformance detection rules from aggregate representations of code example pairs) may be trained and re-trained using algorithms from library 975, model execution subsystem 950 at which the models are executed, as well as a set of machine learning-optimized execution servers 976 (e.g., servers comprising chipsets developed specifically for ML tasks) in the depicted embodiment.

Components of a given service may utilize components of other services in the depicted embodiment—e.g., for some software management service tasks or machine learning service tasks, virtual machines implemented at computing servers such as 905A-905D of the virtualized computing service 903 may be used, code example pair collections as well as rules may be stored a storage servers 925 (e.g., 925A-925D) of storage service 923, and so on. Individual ones of the services shown in FIG. 9 may implement a respective set of programmatic interfaces 977 which can be used by external and/or internal clients (where the internal clients may comprise components of other services) in the depicted embodiment. The provider network may include numerous other services in some embodiments, such as parallel computing services, search services, content management services, and so on.

FIG. 10, FIG. 11, FIG. 12, FIG. 13, FIG. 14 and FIG. 15 collectively illustrate a simple example of automated generation of a rule for detecting non-conformant code, according to at least some embodiments. FIG. 10 illustrates four methods of a source code example pair collection 1000, written in a language similar to Java™, with two of the methods conforming to a particular recommended coding practice or technique, and the other two representing non-conformant or negative examples with respect to the recommended coding practice. Note that although all four examples are shown as part of the same source code file and are part of the same class (with line numbers, starting with 97 and ending with 122 indicated on the left of each line of source code), in practice the examples may typically be found in separate files/classes. In FIG. 10, lines 99-194 show negative example method nonconforming_1, lines 106-109 show negative example method nonconforming_2, lines 111-115 show positive example method conforming_1, while lines 118-122 show positive example conforming_2. Fairly trivial code examples are presented in FIG. 10 to illustrate the concepts involved; in practice, much more complex code may be analyzed to generate non-conformance detection rules in various embodiments. Assume for the purposes of the example that a trusted source code expert has labeled the methods as conforming or non-conforming; the exact logic or thought process used by the expert in this particular scenario to classify some methods as conformant and others as non-conformant is not particularly germane to a discussion of the methodology used to generate the rules.

Figure 11:
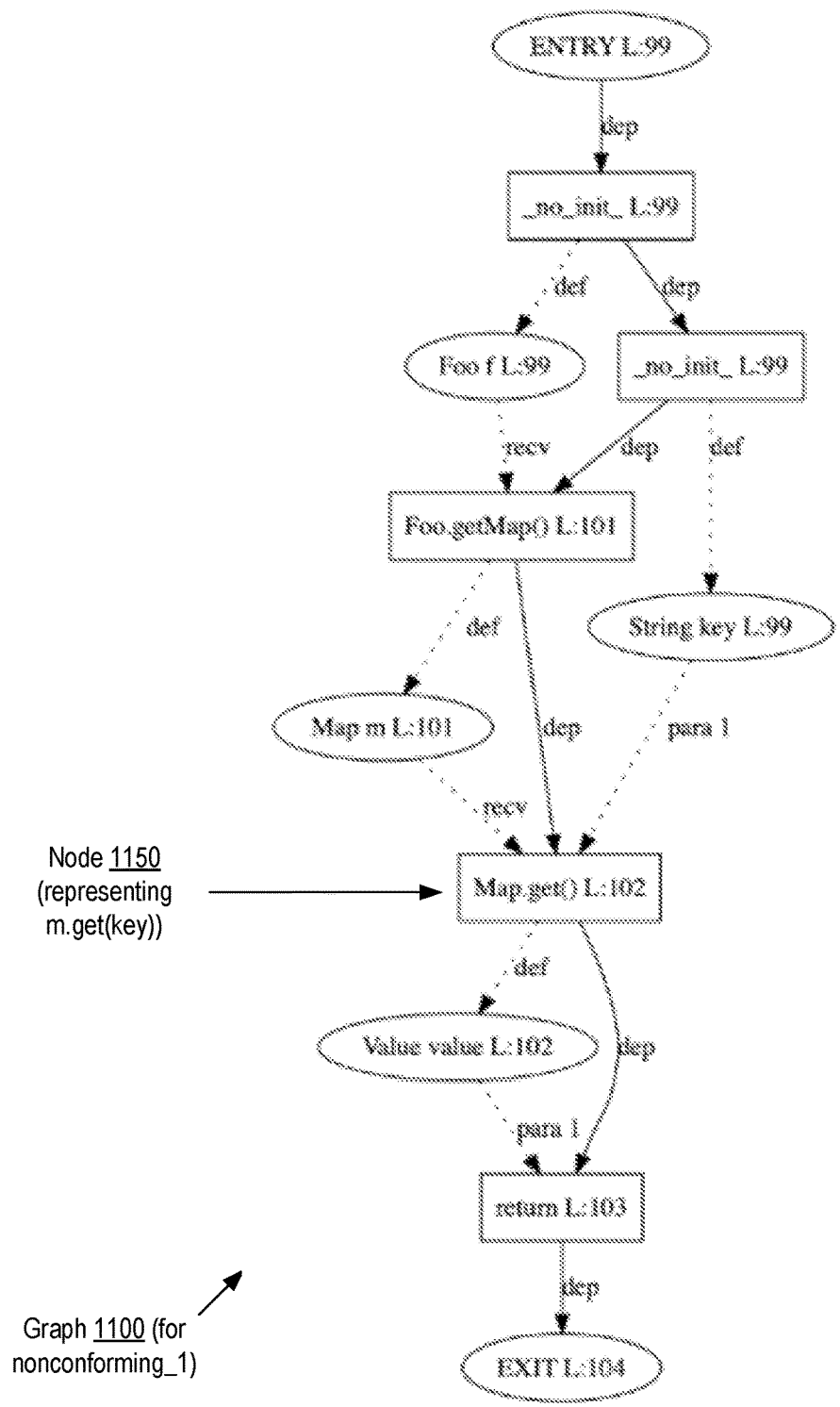
Figure 12:
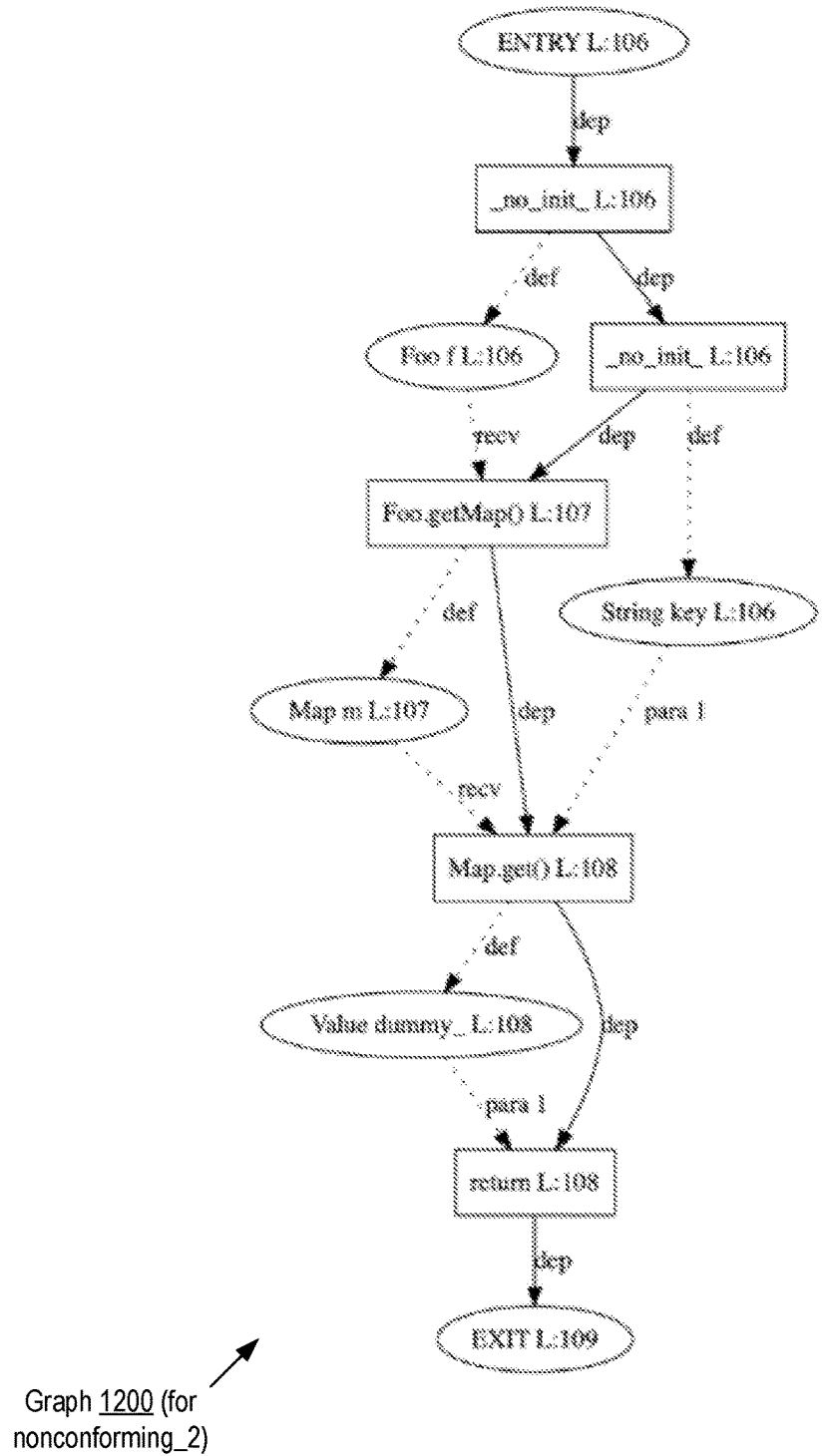
Figure 13:
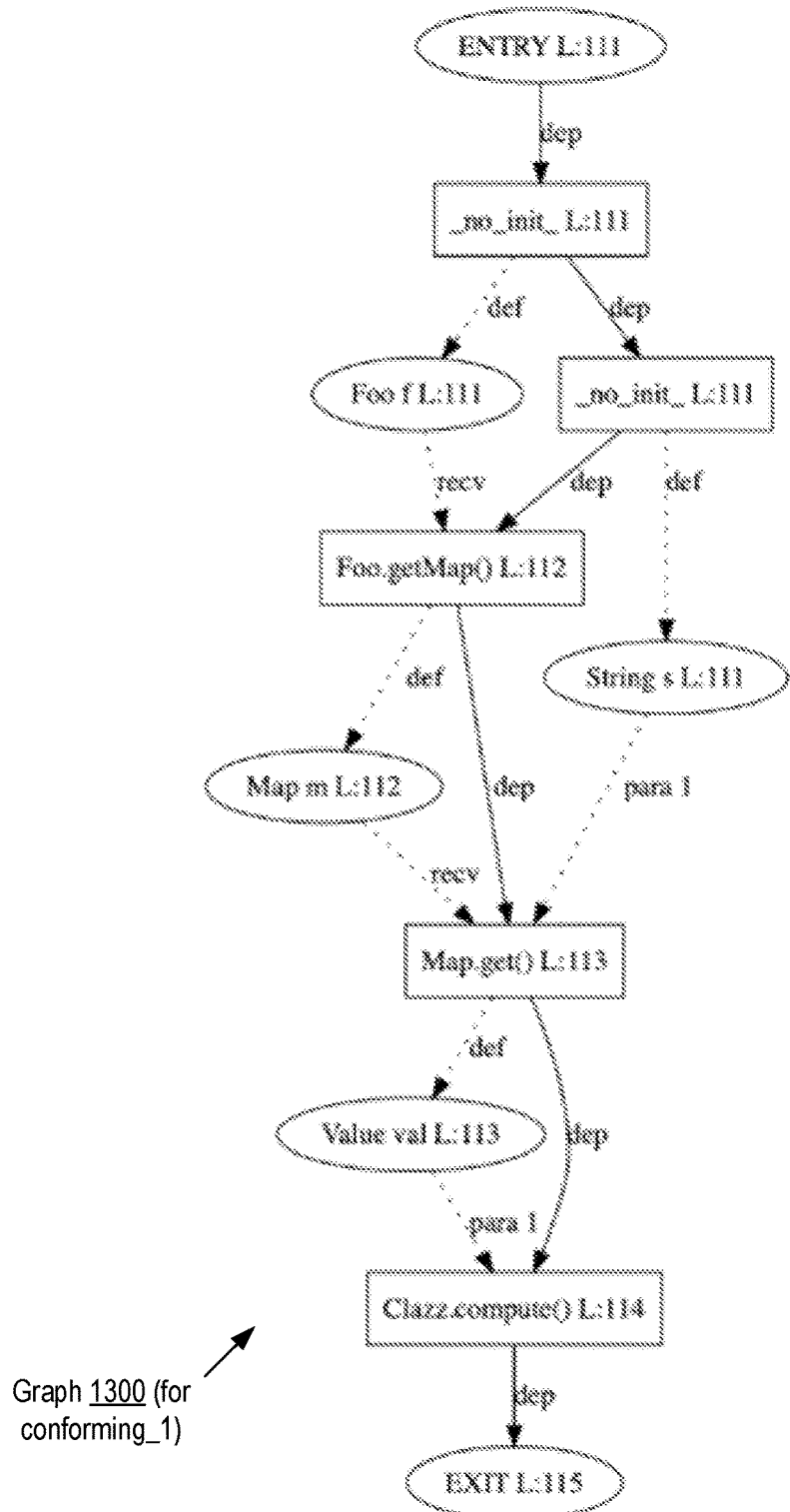
Figure 14:
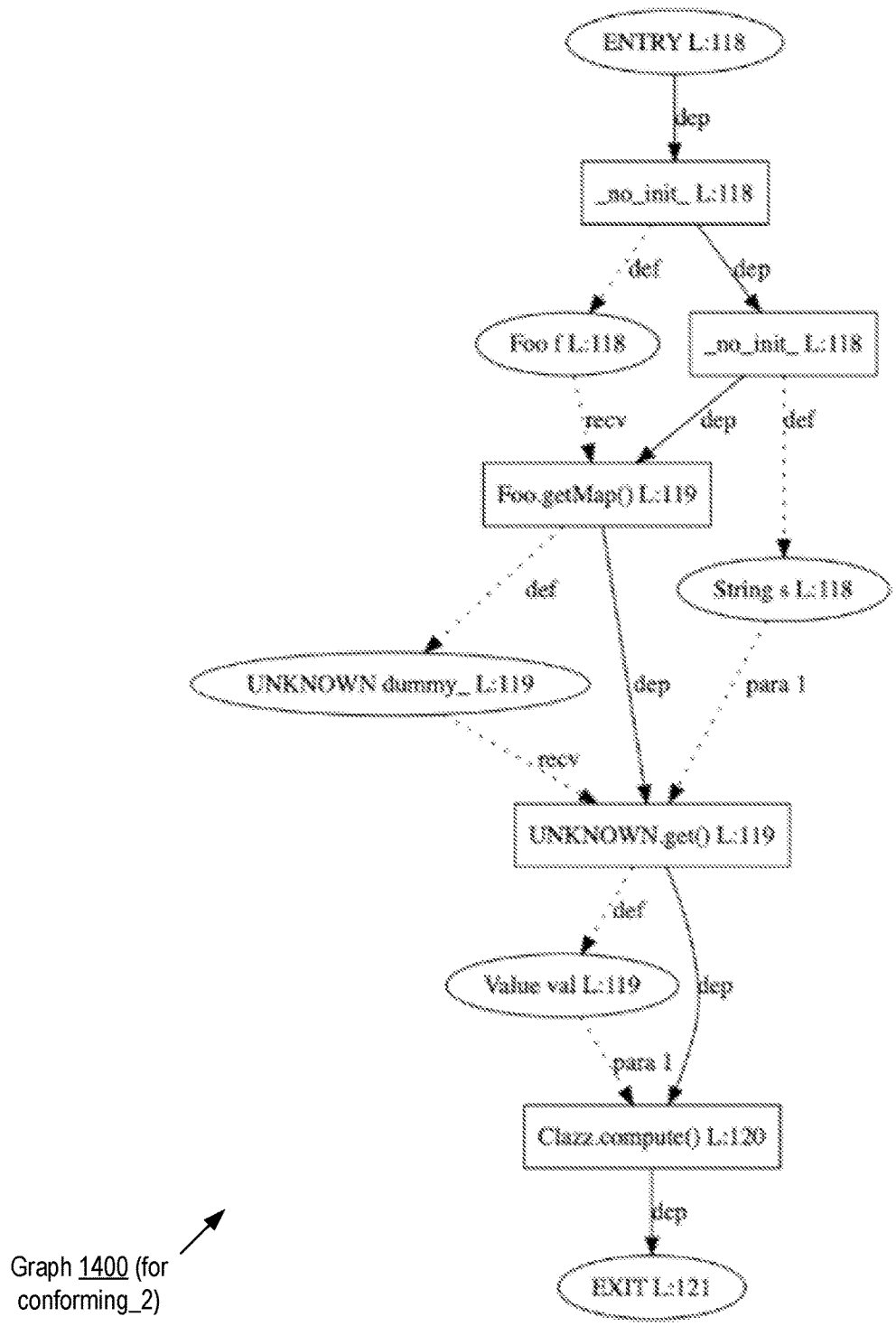

Automatically generated per-example transformed representations of the positive and negative examples, in the form of respective graphs that indicate data dependencies as well as control dependencies, are shown in FIG. 11 (graph 1100 for nonconforming_1), FIG. 12 (graph 1200 for nonconforming_2), FIG. 13 (graph 1300 for conforming_1) and FIG. 14 (graph 1400 for conforming_2). In each of the per-example graphs, the line numbers corresponding to various nodes representing respective code elements are shown for simplicity. Thus, for example, on line 102 of source code example pair collection 1000 in FIG. 10, a method "get(key)" is called on an object m of type Map. This method invocation is represented in graph 1100 of FIG. 11 as node 1150, with the line number 102 indicated by the label "L:102". Labels for other nodes are not provided in FIG. 11-FIG. 15, as the provided line number information is sufficient to correlate nodes with corresponding source code elements. Control dependencies (indicating for example the sequence in which various statements or operations are executed in the source code) are indicated by arrows marked "dep" in FIG. 11-FIG. 15; for example, because the m.get (key) represented by node 1150 is followed by a return on line 103, an arrow labeled dep leads from node 1150 to the node "return L: 103". Data dependencies (such as the dependency on the String Key as a parameter for Map. get( )) are indicated by dashed-line arrows with labels such as "para 1" for the first parameter of a method, "def" for definition relationships, "recv" for receiver relationships, and so on.

Figure 15:
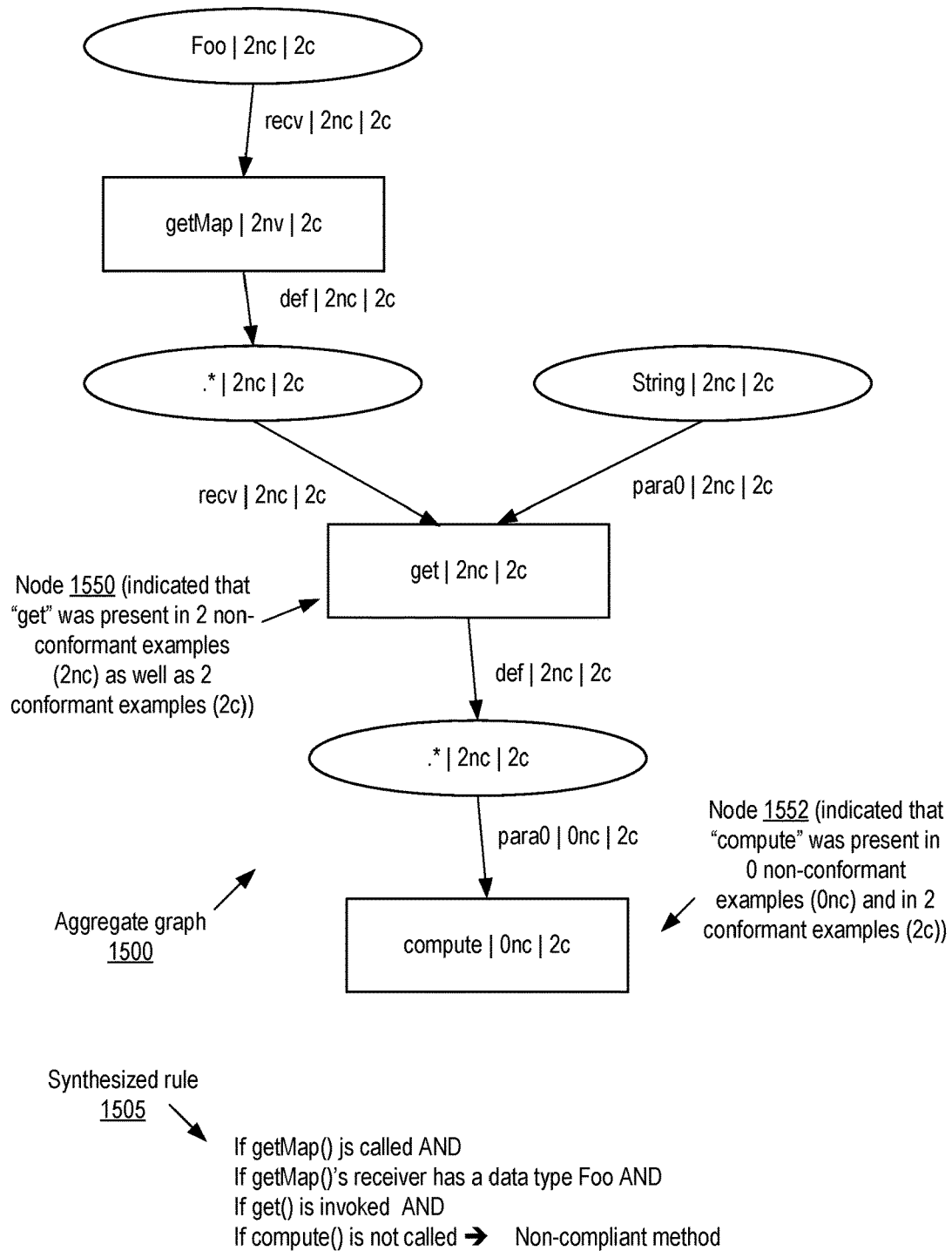

FIG. 15 shows an aggregate graph 1500 that may be derived from analysis of the four per-example graphs of FIG. 11-FIG. 14. Aggregate graph 1500 may be generated using mapping algorithms of the kind discussed earlier, which may take local properties of the components of the per-example graphs into account to identify common features of the per-example graphs. In general, features that are common to negative examples as well as positive example, features that are present among negative examples alone (if any such features can be found), and/or features that are present among positive examples alone (if any such features can be found) may be indicated in the aggregate graph. In the scenario depicted in FIG. 15, for each node and edge included in the aggregate graph, the notation "nc" is used to indicate the number of non-conformant or negative examples that also had that node or edge, and the notation "c" is used to indicate the number of conformant or positive examples that also includes that node or edge. Thus, for example, node 1550 of aggregate graph 1500, labeled "get|2nc|2c" indicates that the method "get" was invoked in two non-conformant examples (2nc) as well as two conformant examples (2c). Node 1552 labeled "compute|0nc|2c" indicates that the "compute" method was invoked in zero non-conformant examples (0nc) but was invoked in two conformant examples (2c).

Synthesized rule 1505, generated by analyzing aggregate graph 1500 using the kinds of techniques discussed earlier, states the combination of Boolean conditions that must hold in a given set of code, if that set of code is to be described as non-conformant with the coding practice illustrated by CEPs of FIG. 10. The conditions shown are (a) that getMap( ) is invoked, (b) that getMap( )'s receiver has a data type Foo, (c) that get( ) is invoked, and (d) that compute( ) is not invoked. Note that many different rules may potentially be generated to detect non-conformance with a given coding practice in general. One of the benefits of the techniques described herein is that the rules generated are typically succinct (i.e., they do not include unneeded predicates), which makes them faster to apply than more verbose rules.

Figure 16:
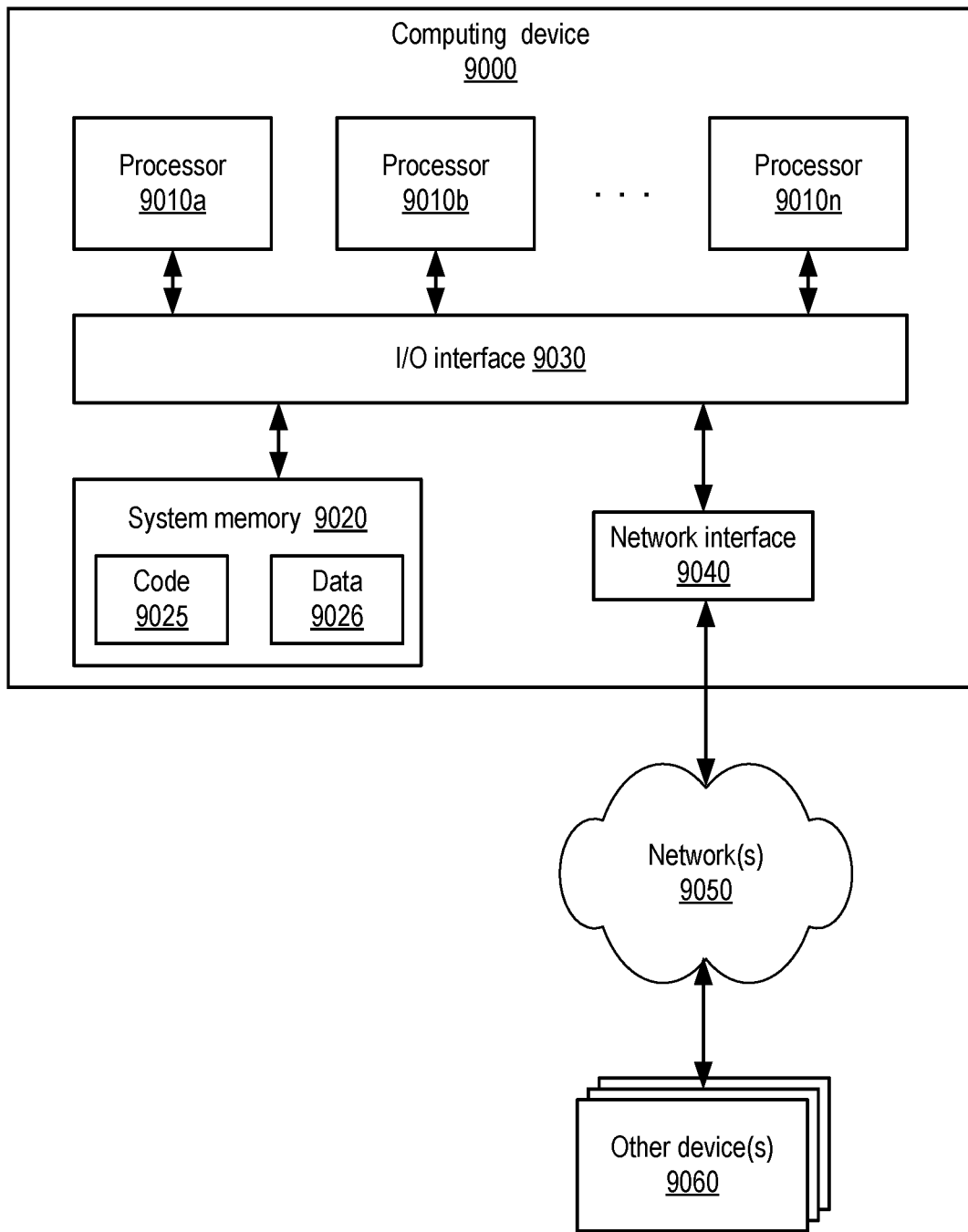
FIG. 16 is a block diagram illustrating an example computing device that may be used in at least some embodiments.

In at least some embodiments, a server that implements the types of techniques described herein (e.g., various functions of a software management service or a code quality enhancement subsystem), may include a general-purpose computer system that includes or is configured to access one or more computer-accessible media. FIG. 16 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 15, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 15. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
one or more computing devices;
wherein the one or more computing devices include instructions that upon execution on or across the one or more computing devices cause the one or more computing devices to:
obtain a first collection of code example pairs, wherein a particular code example pair of the first collection comprises a positive source code example and a negative source code example, wherein the positive source code example utilizes a first recommended coding technique to achieve a programming objective, and wherein the negative source code example is directed to the programming objective and does not utilize the first recommended coding technique;

generate respective per-example transformed representations of individual ones of the source code examples of the first collection, wherein an individual per-example transformed representation indicates (a) at least a portion of a data flow within a source code example and (b) at least a portion of a control flow within the source code example;

construct, using at least the respective per-example transformed representations, an aggregate representation of the first collection, wherein the aggregate representation includes a plurality of nodes and a plurality of edges, wherein individual ones of the nodes correspond to respective source code elements present in at least some code example pairs of the first collection of code example pairs, wherein an edge linking a first node of the plurality of nodes to a second node of the plurality of nodes represents a dependency detected between a source code element corresponding to the first node and a source code element corresponding to the second node;

determine, using one or more machine learning models to which at least a portion of the aggregate representation is provided as input, a rule to automatically detect whether a target set of source code includes one or more code examples which do not utilize the first recommended coding technique, wherein the rule comprises a plurality of predicates associated with respective nodes of the aggregate representation, including at least one predicate identified after a split is introduced into a decision tree for the rule, and wherein the split is introduced based at least in part on a determination that a proposed version of the rule is insufficient to distinguish at least some positive source code examples from corresponding negative source code examples; and provide, based at least in part on a result of applying the rule to a particular set of source code, an indication via one or more programmatic interfaces that the particular set of source code does not utilize the first recommended coding technique.

2. The system as recited in claim 1, wherein the one or more computing devices include further instructions that upon execution on or across the one or more computing devices further cause the one or more computing devices to:
utilize a conjunctive normal form (CNF) formula learning algorithm to determine the rule.

3. The system as recited in claim 1, wherein the one or more computing devices include further instructions that upon execution on or across the one or more computing devices further cause the one or more computing devices to:
obtain, via the one or more programmatic interfaces, a request to review the particular set of source code, wherein the rule is applied to the particular set in response to the request.

4. The system as recited in claim 1, wherein the one or more computing devices include further instructions that upon execution on or across the one or more computing devices further cause the one or more computing devices to:
determine, from the first collection after the rule is applied to the particular set of source code, (a) a particular negative source code example which meets a similarity criterion with respect to at least a subset of the particular set of source code and (b) a corresponding positive source code example; and provide an improvement recommendation for the particular set of source code, wherein the improvement recommendation includes the corresponding positive source code example.

5. The system as recited in claim 1, wherein the one or more computing devices include further instructions that upon execution on or across the one or more computing devices further cause the one or more computing devices to:
automatically extract a plurality of collections of code example pairs associated with respective recommended coding techniques, including the first collection and a second collection, from one or more sources;
store, in a database, respective rules generated from individual collections of the plurality of collections; and
apply, using one or more resources of a provider network, a plurality of rules stored in the database to the particular set of source code.

6. A computer-implemented method, comprising:
constructing an aggregate representation of a first collection of code examples, wherein the first collection comprises (a) a positive source code example which conforms to a recommended coding practice and (b) a negative source code example which does not confirm to the recommended coding practice, wherein the aggregate representation includes a plurality of nodes and a plurality of edges, wherein individual ones of the nodes correspond to respective source code elements present in the first collection of code examples, wherein an edge linking a first node of the plurality of nodes to a second node of the plurality of nodes represents a relationship detected between a source code element corresponding to the first node and a source code element corresponding to the second node;
generating, using a recursive analysis of at least a portion of the aggregate representation, a rule to automatically detect whether a target set of source code includes one or more code examples which do not conform to the recommended coding practice, wherein the rule comprises a plurality of predicates associated with respective nodes of the aggregate representation; and
providing, based at least in part on a result of applying the rule to a particular set of source code, an indication via one or more programmatic interfaces that the particular set of source code does not conform to the recommended coding practice.

7. The computer-implemented method as recited in claim 6, further comprising:
analyzing a plurality of code check-ins directed to a source code repository, wherein at least one code example of the first collection is identified based on said analyzing.

8. The computer-implemented method as recited in claim 6, further comprising:
receiving, via a programmatic interface of a service of a provider network, a request to review the particular set of source code, wherein the rule is applied to the particular set in response to the request.

9. The computer-implemented method as recited in claim 6, further comprising:
receiving, via a programmatic interface of a service of a provider network, a request to retrieve at least the particular set of source code from a repository, wherein the rule is applied to the particular set of source code in response to the request.

10. The computer-implemented method as recited in claim 6, wherein the rule is applied to the particular set of source code in response to a request to compile at least the particular set of source code.

11. The computer-implemented method as recited in claim 6, wherein the rule is applied to the particular set of source code in response to a programmatic interaction with an integrated development environment (IDE).

12. The computer-implemented method as recited in claim 6, further comprising:
  generating (a) a first program dependency graph representing a positive source code example of the first collection and (b) a second program dependency graph representing a negative source code example of the first collection; and
  determining a similarity-based mapping between a first node of the first program dependency graph and a second node of the second program dependency graph based at least in part on one or more properties of the first and second nodes, selected from a set of properties comprising (a) a name of an invoked method or function, (b) a number of parameters of a method invocation or function call, (c) a data type of a programming construct within which a method or function is defined, and (d) a number of nodes within a particular edge-count-neighborhood of a first node for which corresponding similarity-based mappings have been identified within the particular edge-count-neighborhood of the second node, wherein the aggregate representation is generated based at least in part on the similarity-based mapping between the first node and the second node.

13. The computer-implemented method as recited in claim 6, wherein constructing the aggregate representation comprises utilizing a linear optimization algorithm.

14. The computer-implemented method as recited in claim 6, further comprising:
  determining, from the first collection after the rule is applied to the particular set of source code, (a) a particular negative source code example which meets a similarity criterion with respect to at least a subset of the particular set of source code and (b) a corresponding positive source code example; and
  providing an improvement recommendation for the particular set of source code, wherein the improvement recommendation includes the corresponding positive source code example.

15. The computer-implemented method as recited in claim 6, further comprising:
  obtaining respective sets of annotations for one or more of the code examples of the first collection, wherein the aggregate representation is constructed using at least the respective sets of annotations.

16. One or more non-transitory computer-accessible storage media storing program instructions that when executed on or across one or more processors cause the one or more processors to:
  construct an aggregate representation of a first collection of code examples, wherein first collection comprises (a) a positive source code example which conforms to a recommended coding practice and (b) a negative source code example which does not confirm to the recommended coding practice, wherein the aggregate representation includes a plurality of nodes and a plurality of edges, wherein individual ones of the nodes correspond to respective source code elements present in the first collection of code examples, wherein an edge linking a first node of the plurality of nodes to a second node of the plurality of nodes represents a relationship detected between a source code element corresponding to the first node and a source code element corresponding to the second node;
  generate, using an iterative analysis of at least a portion of the aggregate representation, a rule to automatically detect whether a target set of source code does not conform to the recommended coding practice, wherein the rule comprises a plurality of predicates associated with respective nodes of the aggregate representation; and
  provide, based at least in part on a result of applying the rule to a particular set of source code, an indication via one or more programmatic interfaces that the particular set of source code does not conform to the recommended coding practice.

17. The one or more non-transitory computer-accessible storage media as recited in claim 16, storing further program instructions that when executed on or across one or more processors further cause the one or more processors to:
  examine a plurality of code check-ins directed to a source code repository, wherein at least one code example of the first collection is identified based on examination of the plurality of code check-ins.

18. The one or more non-transitory computer-accessible storage media as recited in claim 16, storing further program instructions that when executed on or across one or more processors further cause the one or more processors to:
  receive a request indicating the particular set of source code at a network-accessible service, wherein the rule is applied to the particular set in response to the request.

19. The one or more non-transitory computer-accessible storage media as recited in claim 16, storing further program instructions that when executed on or across one or more processors further cause the one or more processors to:
  obtain, via a programmatic interface of a service of a provider network, a request to modify the rule; and
  provide, based at least in part on a result of applying a modified version of the rule to another set of source code, an indication via one or more programmatic interfaces that the other set of source code does not conform to the recommended coding practice, wherein the modified version of the rule is generated in response to the request to modify the rule.

20. The one or more non-transitory computer-accessible storage media as recited in claim 16, storing further program instructions that when executed on or across one or more processors further cause the one or more processors to:
  obtain, via a programmatic interface of a service of a provider network, at least a portion of a code example of the first collection.

* * * * *